(12) United States Patent
Deng et al.

(10) Patent No.: US 11,972,106 B2
(45) Date of Patent: Apr. 30, 2024

(54) SPLIT SCREEN METHOD AND APPARATUS, AND ELECTRONIC DEVICE

(71) Applicant: HUAWEI TECHNOLOGIES CO., LTD., Guangdong (CN)

(72) Inventors: Meng Deng, Shanghai (CN); Jianxun Shen, Shanghai (CN); Kai Li, Shanghai (CN); Kuiquan Sun, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/245,688

(22) PCT Filed: Aug. 9, 2021

(86) PCT No.: PCT/CN2021/111459
§ 371 (c)(1),
(2) Date: Mar. 16, 2023

(87) PCT Pub. No.: WO2022/057512
PCT Pub. Date: Mar. 24, 2022

(65) Prior Publication Data
US 2023/0350569 A1 Nov. 2, 2023

(30) Foreign Application Priority Data
Sep. 18, 2020 (CN) .......................... 202010989855.7

(51) Int. Cl.
*G06F 3/04886* (2022.01)
*G06F 3/04842* (2022.01)
*G06F 3/04845* (2022.01)

(52) U.S. Cl.
CPC ...... *G06F 3/04886* (2013.01); *G06F 3/04842* (2013.01); *G06F 3/04845* (2013.01); *G06F 2203/04803* (2013.01)

(58) Field of Classification Search
None
See application file for complete search history.

(56) References Cited

U.S. PATENT DOCUMENTS

2020/0034033 A1* 1/2020 Chaudhri ............ G06F 3/04842
2020/0042171 A1* 2/2020 Tao .......................... G06F 9/451

FOREIGN PATENT DOCUMENTS

CN 110913066 A 3/2020

* cited by examiner

*Primary Examiner* — Christopher J Kohlman
(74) *Attorney, Agent, or Firm* — Fish & Richardson P.C.

(57) ABSTRACT

The present disclosure relates to split screen methods and apparatuses. One example method includes displaying a first interface of a first application on a display, where the first interface includes a first control. A first operation input by a user is detected. Prompt information is displayed in response to the detected first operation, where the prompt information is used to prompt that the first control supports split screen. A second operation input by the user on the first control is detected. A second interface is displayed in response to the detected second operation, where the second interface includes a first window and a second window. A third interface corresponding to the first interface is displayed in the first window, and a second control corresponding to the first control is displayed in the second window.

20 Claims, 20 Drawing Sheets

SPLIT SCREEN METHOD AND APPARATUS, AND ELECTRONIC DEVICE

CROSS-REFERENCE TO RELATED APPLICATIONS

This application is a National Stage of International Application No. PCT/CN2021/111459, filed on Aug. 9, 2021, which claims priority to Chinese Patent Application No. 202010989855.7, filed on Sep. 18, 2020, both of which are hereby incorporated by reference in their entireties.

TECHNICAL FIELD

This application relates to the field of communications technologies, and in particular, to a split screen method and apparatus, and an electronic device.

BACKGROUND

With development of a mobile Internet, more applications are supported on an electronic device such as a mobile phone or a tablet computer. With the applications on the electronic device, a user can work, entertain themselves, and perform other activities. However, currently, a size of an application interface displayed on a display of the electronic device is usually limited by a size of the display, or is limited by a quantity of applications running on the electronic device, or the like. Consequently, it is difficult for the user to perform a corresponding operation on the application interface. For example, when the user uses a chat application to chat on a mobile phone, if a screen of the mobile phone is small, a chat interface of the chat application is also small. This brings great inconvenience to the user in viewing and inputting chat content.

SUMMARY

This application provides a split screen method and apparatus, and an electronic device, to perform a split screen operation on a control on an application interface. In this way, a user can select a desired control for split screen in the application interface, and perform a corresponding operation on the split screen control. This improves user experience, and resolves a technical problem that it is difficult for the user to perform the corresponding operation on the application interface when a size of the application interface on the electronic device is limited.

According to a first aspect, this application provides a split screen method, applied to an electronic device having a display. The method includes:

displaying a first interface of a first application on the display, where the first interface includes a first control;

detecting a first operation input by a user;

displaying prompt information in response to the detected first operation, where the prompt information is used to prompt that the first control supports split screen;

detecting a second operation input by the user on the first control; and displaying a second interface in response to the detected second operation, where the second interface includes a first window and a second window, a third interface corresponding to the first interface is displayed in the first window, and a second control corresponding to the first control is displayed in the second window.

Therefore, a split screen operation is performed on the control on the application interface, so that a user can perform a corresponding operation on the split screen window, improving user experience.

In a possible implementation, a size of a target area of the second control is larger than a size of a target area of the first control on the third interface. The target area includes at least one of an input area and a display area. Therefore, the user can more conveniently perform a corresponding operation on the second control, for example, perform an input operation.

Further, the first control includes a text input control. Text information presented on the second control is more than text information presented on the first control on the third interface. Text information included in the second control is the same as text information included in the first control on the third interface. Therefore, text information input by the user can be completely presented to the user on the second control. This avoids a phenomenon that only a part of text information is presented on the first control, and improves user experience.

In a possible implementation, the second window floats above the first window. Therefore, an arrangement manner of the first window and the second window is provided.

Further, a transparency of the second window is higher than a preset transparency. Therefore, information displayed in the first window can be viewed through the second window.

In a possible implementation, the second window is located on an upper side, a lower side, a left side, or a right side of the first window. There is no overlap between the second window and the first window.

In a possible implementation, a size of the first window is larger than or equal to a size of the second window. Therefore, an arrangement manner of the first window and the second window is provided.

In a possible implementation, a display size of the third interface is smaller than or equal to a display size of the first interface. Therefore, a change status of a size of the application interface displayed on the display before and after a split screen operation on the control is provided.

In a possible implementation, a display size of the third interface is smaller than a display size of the first interface. First information displayed in the third interface is less than second information displayed in the first interface. Each of the first information and the second information includes at least one of text information and image information. The first information and the second information are of a same type. Therefore, a change status of information displayed on the application interface displayed on the display before and after a split screen operation on the control is provided.

In a possible implementation, a display size of the third interface is smaller than a display size of the first interface. Third information displayed in the third interface is the same as fourth information displayed in the first interface. A magnitude of the third information is less than a magnitude of the fourth information. Each of the third information and the fourth information includes at least one of text information and image information. The third information and the fourth information are of a same type. Therefore, a change status of information displayed on the application interface displayed on the display before and after a split screen operation on the control is provided.

In a possible implementation, the method further includes:

detecting a third operation input by the user; and adjusting a status parameter of the second window in response to the detected third operation, where the status parameter includes at least one of a size and a location. In this way, the status parameter of the second window is adjusted.

In a possible implementation, the method further includes:

determining that data in the second control has changed, and synchronizing changed data to the first control on the third interface. In this way, data is synchronized between the second control and the first control on the third interface, ensuring data consistency between the second control and the first control on the third interface.

In a possible implementation, the method further includes:

detecting a fourth operation input by the user in the first window, where the fourth operation is used to indicate to switch the first application to a second application; and displaying an interface of the second application in the first window in response to the detected fourth operation. In this way, the applications can be switched in the first window.

In a possible implementation, after the displaying a second interface, the method further includes:

detecting a fifth operation input by the user on the second interface, where the fifth operation is used to indicate to exit the second interface; and displaying the first interface in response to the detected fifth operation. In this way, a split screen operation on the control is exited.

According to a second aspect, this application provides a split screen apparatus, deployed on an electronic device having a display. The apparatus includes:

a display module, configured to display a first interface of a first application on the display, where the first interface includes a first control; and a detection module, configured to detect a first operation input by a user.

The display module is further configured to display prompt information in response to the first operation detected by the detection module. The prompt information is used to prompt that the first control supports split screen.

The detection module is further configured to detect a second operation input by the user on the first control.

The display module is further configured to display a second interface in response to the second operation detected by the detection module. The second interface includes a first window and a second window. A third interface corresponding to the first interface is displayed in the first window. A second control corresponding to the first control is displayed in the second window.

In a possible implementation, a size of a target area of the second control is larger than a size of a target area of the first control on the third interface. The target area includes at least one of an input area and a display area.

In a possible implementation, the first control includes a text input control. Text information presented on the second control is more than text information presented on the first control on the third interface. Text information included in the second control is the same as text information included in the first control on the third interface.

In a possible implementation, the second window floats above the first window.

In a possible implementation, a transparency of the second window is higher than a preset transparency.

In a possible implementation, the second window is located on an upper side, a lower side, a left side, or a right side of the first window. There is no overlap between the second window and the first window.

In a possible implementation, a size of the first window is larger than or equal to a size of the second window.

In a possible implementation, a display size of the third interface is smaller than or equal to a display size of the first interface.

In a possible implementation, a display size of the third interface is smaller than a display size of the first interface. First information displayed in the third interface is less than second information displayed in the first interface. Each of the first information and the second information includes at least one of text information and image information. The first information and the second information are of a same type.

In a possible implementation, a display size of the third interface is smaller than a display size of the first interface. Third information displayed in the third interface is the same as fourth information displayed in the first interface. A magnitude of the third information is less than a magnitude of the fourth information. Each of the third information and the fourth information includes at least one of text information and image information. The third information and the fourth information are of a same type.

In a possible implementation, the detection module is further configured to detect a third operation input by the user.

The apparatus further includes an adjustment module, configured to adjust a status parameter of the second window in response to the third operation detected by the detection module. The status parameter includes at least one of a size and a location.

In a possible implementation, the apparatus further includes:

a data synchronization module, configured to determine that data in the second control has changed, and synchronize changed data to the first control on the third interface.

In a possible implementation, the detection module is further configured to detect a fourth operation input by the user in the first window. The fourth operation is used to indicate to switch the first application to a second application.

The display module is further configured to display an interface of the second application in the first window in response to the fourth operation detected by the detection module.

In a possible implementation, the detection module is further configured to detect a fifth operation input by the user on the second interface. The fifth operation is used to indicate to exit the second interface.

The display module is further configured to display the first interface in response to the fifth operation detected by the detection module.

According to a third aspect, this application provides a split screen apparatus, including:

at least one memory, configured to store a program; and at least one processor, configured to execute the program stored in the memory, where when the program stored in the memory is executed, the processor is configured to perform the method provided in the first aspect.

According to a fourth aspect, this application provides an electronic device, including the apparatus provided in the second aspect or the third aspect.

According to a fifth aspect, this application provides a computer storage medium. The computer storage medium stores instructions, and when the instructions are run on a computer, the computer is enabled to perform the method provided in the first aspect.

According to a sixth aspect, this application provides a computer program product including instructions. When the instructions are run on a computer, the computer is enabled to perform the method provided in the first aspect.

According to a seventh aspect, this application provides a chip, including at least one processor and an interface.

The interface is configured to provide program instructions or data for the at least one processor.

The at least one processor is configured to execute the program instructions, to implement the method provided in the first aspect.

DESCRIPTION OF EMBODIMENTS

To make the purpose, technical solutions, and advantages of embodiments of this application clearer, the following describes the technical solutions of embodiments of this application with reference to the accompanying drawings.

In embodiments of this application, the term such as "example" or "for example" is used to represent an example, an illustration, or a description. Any embodiment or design scheme described as an "example". "for example", or the like in embodiments of this application should not be explained as being more preferred or having more advantages than another embodiment or design scheme. Exactly, use of the term "example", "for example", or the like is intended to present a relative concept in a specific manner.

The term "and/or" in embodiments of this application describes only an association relationship for describing associated objects and represents that three relationships may exist. For example, A and/or B may represent the following three cases: Only A exists, only B exists, and both A and B exist. In addition, the term "a plurality of" means two or more, unless otherwise specified. For example, a plurality of systems mean two or more systems, and a plurality of screen terminals mean two or more screen terminals.

In addition, the terms "first" and "second" are only intended for a purpose of description, and shall not be understood as an indication or implication of relative importance or implicit indication of indicated technical features. Therefore, a feature limited by "first" or "second" may explicitly indicate or implicitly include one or more such features. The terms "include", "comprise", "have", and their variants all mean "include but are not limited to", unless otherwise specifically emphasized in another manner.

Figure 1:
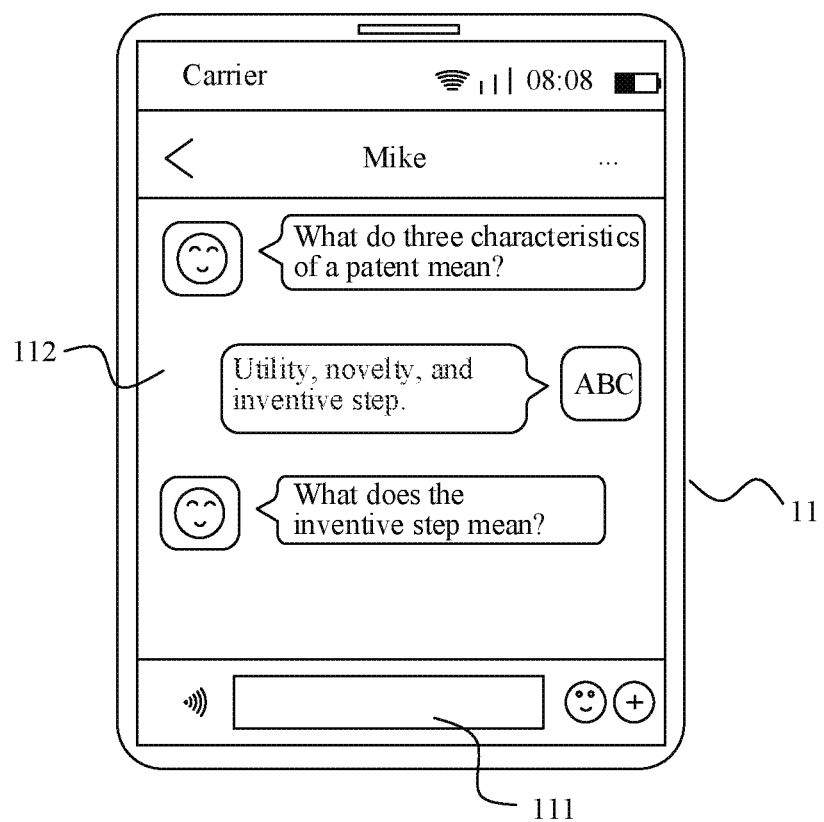
FIG. 1 is a schematic diagram of an application scenario according to an embodiment of this application.

FIG. 1 is a schematic diagram of an application scenario according to an embodiment of this application. As shown in FIG. 1, in a chat interface displayed on an electronic device 11, a text input control 111 is relatively small. When a user inputs a large amount of text information by using the text input control 111, the text input control 111 can display only a part of the text information, resulting in poor user experience. However, this embodiment of this application uses a split screen method for a visual control on an interface of an application, to display, in a separate window, a control desired by the user for split screen. In this way, the user can perform a corresponding operation on the split screen window, improving user experience. In an example, the visual control is, for example, a text input control, a voice input control, an image input control, or a display control.

It should be noted that, in this embodiment of this application, the split screen operation is performed on the visual control on the interface of the application. For example, the split screen operation is performed on the text input control 111 in FIG. 1, but not on an entire interface of the application.

It may be understood that, in this embodiment of this application, the electronic device may be a mobile phone, a tablet computer, a digital camera, a personal digital assistant (personal digital assistant, PDA), a wearable device, a smart television, a Huawei smart screen, or the like. Example embodiments of the electronic device include but are not limited to an electronic device provided with iOS, Android, Windows, Harmony OS (Harmony OS), or another operating system. Alternatively, the electronic device may be another electronic device, for example, a laptop computer (laptop) having a touch-sensitive surface (for example, a touch panel). A type of the electronic device is not specifically limited in this embodiment of this application.

Figure 2:
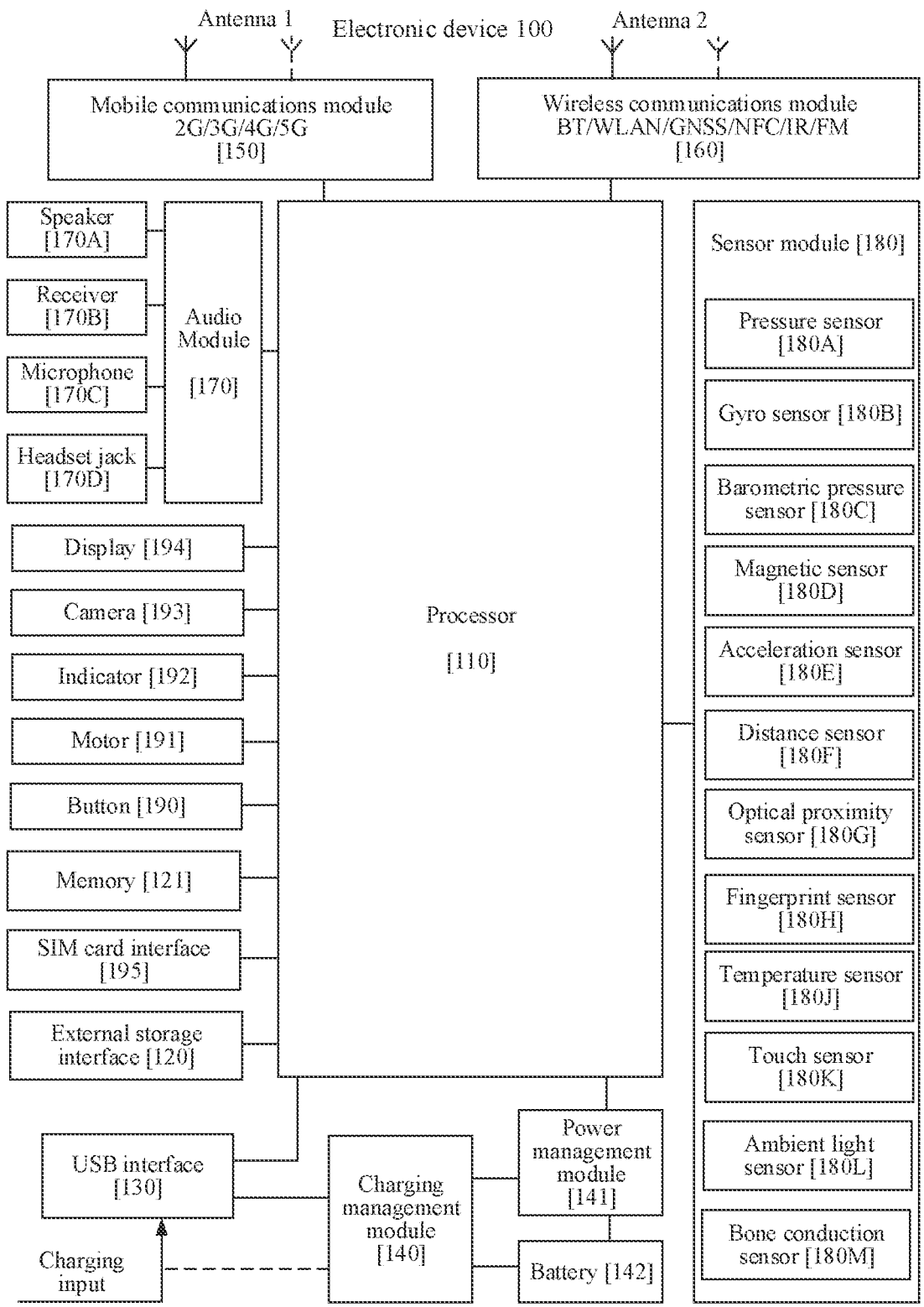
FIG. 2 is a schematic diagram of a hardware structure of an electronic device according to an embodiment of this application.

FIG. 2 is a schematic diagram of a hardware structure of an electronic device according to an embodiment of this application. As shown in FIG. 2, the electronic device 100 may include a processor 110, an external storage interface 120, a memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The devices shown in the figure may be implemented by using hardware, software, or a combination of software and hardware.

The processor 110 may include one or more processing units. For example, the processor 110 may include an application processor (application processor, AP), a modem (modem), a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be separate devices, or may be integrated into one or more processors. In some examples, the processor 110 may determine, based on information such as coordinates and a timestamp of a detected touch operation, whether the touch operation is a predefined gesture for enabling a split screen function of the electronic device 100. A location, size, and the like of a split screen window are determined based on a status of a window currently displayed on the display 194 of the electronic device 100.

The controller may generate an operation control signal based on an instruction operation code and a time sequence signal, to complete control on instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor 110 may directly invoke the instructions or the data from the memory, to avoid repeated access and reduce waiting time of the processor 110. This can improve efficiency of the electronic device.

In some examples, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface. MIPI), a general purpose input/output ports (general purpose I/O ports, GPIO) interface, a subscriber identity module (subscriber identity module, SIM) interface, a universal serial bus (universal serial bus, USB) interface, and/or the like.

It may be understood that an interface connection relationship between the modules illustrated in this embodiment of this application is only an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some examples of wired charging, the charging management module 140 may receive a charging input of a wired charger through the USB interface 130. In some examples of wireless charging, the charging management module 140 may receive a wireless charging input through a wireless charging coil of the electronic device 100. The charging management module 140 supplies power to another electronic device through the power management module 141 while charging the battery 142.

The power management module 141 is configured to connect the battery 142, the charging management module 140, and the processor 110. The power management module 141 receives an input of the battery 142 and/or the charging management module 140, and supplies power to the processor 110, the memory 121, an external storage, the display 194, the camera 193, the wireless communications module 160, and the like. The power management module 141 may be further configured to monitor parameters such as a battery capacity, a battery cycle quantity, and a battery health status (leakage and impedance). In some other examples, the power management module 141 may alternatively be disposed in the processor 110. In some other examples, the power management module 141 and the charging management module 140 may alternatively be disposed in a same device.

A wireless communications function of the electronic device 100 may be implemented through the antenna 1, the antenna 2, the mobile communications module 150, the wireless communications module 160, the modem, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed, to improve antenna utilization. For example, the antenna 1 may be multiplexed as a diversity antenna in a wireless local area network. In some other examples, the antenna may be used in combination with a tuning switch.

The mobile communications module 150 may provide a solution for wireless communications such as 2G/3G/4G/5G that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through at least two antennas including the antenna 1, perform processing such as filtering or amplification on the received electromagnetic wave, and transmit the electromagnetic wave to the modem for demodulation. The mobile communications module 150 may further amplify a signal modulated by the modem, and convert the signal into an electromagnetic wave for radiation through the antenna 1. In some examples, at least some function modules in the mobile communications module 150 may be disposed in the processor 110. In some examples, at least some function modules of the mobile communications module 150 may be disposed in a same device as at least some modules of the processor 110.

The modem may include a modulator and a demodulator. The modulator is configured to modulate a to-be-sent low-frequency baseband signal into a medium and high frequency signal. The demodulator is configured to demodulate a received electromagnetic wave signal into a low-frequency baseband signal. Then, the demodulator transmits the demodulated low-frequency baseband signal to the baseband processor for processing. The low frequency baseband signal is processed by the baseband processor and then transferred to the application processor. The application processor outputs a sound signal by using an audio device (which is not limited to the speaker 170A, the receiver 170B, and the like), or displays an image or a video on the display 194. In some examples, the modem may be a separate device. In some other examples, the modem may be independent of the processor 110, and is disposed in a same device as the mobile communications module 150 or another function module. In some other examples, the mobile communications module 150 may be a module in the modem.

The wireless communications module 160 may provide a wireless communications solution that is applied to the electronic device 100, and that includes a wireless local area network (wireless local area networks, WLAN) (for example, a wireless fidelity (wireless fidelity, Wi-Fi) network), Bluetooth (bluetooth. BT), a global navigation satellite system (global navigation satellite system, GNSS), frequency modulation (frequency modulation, FM), a near field communications (near field communications, NFC) technology, an infrared (infrared, IR) technology, or the like. The wireless communications module 160 may be one or more devices integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some examples, the antenna 1 and the mobile communications module 150 in the electronic device 100 are coupled, and the antenna 2 and the wireless communications module 160 in the electronic device 100 are coupled. In this way, the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access. CDMA), wideband code division multiple access (wideband code division multiple access, WCDMA), time-division code division multiple access (time-division code division multiple access, TD-SCDMA), long term evolution (long term evolution, LTE), a 5th generation, a new radio (new radio, NR), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some examples, the electronic device 100 may include one or more displays 194. In an example, the display 194 may be configured to display an interface of an application, a visual control on the interface of the application, an application interface obtained after a split screen operation, and the like.

The electronic device 100 can implement a shooting function by using the ISP, the camera 193, the video coder, the GPU, the display 194, the application processor, and the like.

The ISP is configured to process data fed back by the camera 193. For example, during shooting, a shutter is pressed, and light is transmitted to a photosensitive element of the camera through a lens. An optical signal is converted into an electrical signal. The photosensitive element of the camera transmits the electrical signal to the ISP for processing, to convert the electrical signal into a visible image. The ISP may further perform algorithm optimization on noise, brightness, and a skin tone of the image. The ISP may further optimize parameters such as exposure and a color temperature in a shooting scenario. In some examples, the ISP may be disposed in the camera 193.

The camera 193 is configured to capture a still image or a video, for example, capture facial feature information and posture feature information of a person. An optical image of an object is generated through the lens, and is projected onto the photosensitive element. The photosensitive element may be a charge coupled device (charge coupled device, CCD), or a complementary metal oxide semiconductor (complementary metal oxide semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some examples, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transform or the like on frequency energy.

The video codec is configured to compress or decompress a digital video. The electronic device 100 may support one or more types of video codecs. Therefore, the electronic device 100 may play or record videos in a plurality of encoding formats, for example, moving picture experts group (moving picture experts group, MPEG)-1, MPEG-2, MPEG-3, and MPEG-4.

The external storage interface 120 may be used to connect to an external storage card, for example, a micro SD card, to extend a storage capability of the electronic device 100. The external storage card communicates with the processor 110 through the external storage interface 120, to implement a data storage function. For example, a file such as music and a video is stored in the external storage card.

The memory 121 may be configured to store computer-executable program code. The executable program code includes instructions. The processor 110 implements various function applications and data processing of the electronic device 100 by running the instructions stored in the memory 121. The memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the electronic device 100. In addition, the memory 121 may include a high-speed random access memory, and may further include a nonvolatile memory, for example, at least one magnetic disk storage device, a flash memory device, or a universal flash storage (universal flash storage, UFS).

The electronic device 100 may implement an audio function such as music playing and recording through the audio module 170, the speaker 170A, the receiver 170B, the microphone 170O, the headset jack 170D, the application processor, and the like.

The audio module 170 is configured to convert digital audio information into an analog audio signal output, and is further configured to convert an analog audio input into a digital audio signal. The audio module 170 may be further configured to encode and decode an audio signal. In some examples, the audio module 170 may be disposed in the processor 110, or some function modules in the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an electrical audio signal into a sound signal. When a call is answered or a voice message is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may place the mouth near the microphone 170C to make a sound, to input a sound signal to the microphone 170C. At least one microphone 170C may be disposed in the electronic device 100. In some other examples, two microphones 170C may be disposed in the electronic device 100, to collect a sound signal and implement a noise reduction function. In some other examples, three, four, or more microphones 170C may alternatively be disposed in the electronic device 100, to collect a sound signal, implement noise reduction, and identify a sound source, to implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some examples, the pressure sensor 180A may be disposed in the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, a capacitance between electrodes changes. The electronic device 100 determines pressure intensity based on a capacitance change. When a touch operation is performed on the display 194, the electronic device 100 detects intensity of the touch operation through the pressure sensor 180A. The electronic device 100 may calculate a touch location based on a detection signal of the pressure sensor 180A. In some examples, touch operations that are performed in a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to a first pressure threshold is performed on a Messages icon, an instruction for creating a new SMS message is executed.

In some embodiments of this application, the predefined gesture for triggering the electronic device 100 to enable the split screen function may be pressing on the display 194. After detecting a touch operation of the user, the electronic device 100 may detect intensity of the touch operation based on the pressure sensor 180A. When detecting that intensity of the touch operation is greater than a preset threshold, the electronic device 100 may consider that the touch operation is a gesture for enabling the split screen function. In this case, the electronic device 100 enables the split screen function.

The gyro sensor 180E may be configured to determine a motion posture of the electronic device 100. In some examples, angular velocities of the electronic device 100 around three axes (namely, x, y, and z axes) may be determined through the gyro sensor 180B. The gyro sensor 180B may be used for image stabilization. For example, when the electronic device 100 is used to collect user characteristic information in an environment, the gyro sensor 180B detects an angle at which the electronic device 100 jitters, calculates, based on the angle, a distance to be compensated by a lens module, and reverses the lens to remove jitter of the electronic device 100, to implement image stabilization.

The barometric pressure sensor 180C is configured to measure barometric pressure. In some examples, the electronic device 100 calculates an altitude by using a barometric pressure value measured by the barometric pressure sensor 180C, to assist in positioning and navigation.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure a distance through infrared or laser. In some examples, when the electronic device is used to collect the user characteristic information in an environment, the electronic device 100 may use the distance sensor 180F to measure a distance, to implement fast focusing.

The ambient light sensor 180L is configured to sense ambient light brightness. The electronic device 100 may adaptively adjust brightness of the display 194 based on the sensed ambient light brightness.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some examples, the electronic device 100 executes a temperature processing policy based on the temperature detected by the temperature sensor 180J. For example, when a temperature reported by the temperature sensor 180J exceeds a threshold, the electronic device 100 degrades performance of a processor near the temperature sensor 180J, to reduce power consumption for thermal protection. In some other embodiments, when the temperature is less than another threshold, the electronic device 100 heats the battery 142 to avoid abnormal shutdown of the electronic device 100 caused by a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch device". The touch sensor 180K may be disposed on the display 194, and the touch sensor 180K and the display 194 form a touchscreen, also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device 100 at a location different from a location of the display 194. For example, the predefined gesture for triggering the electronic device 100 to enable the split screen function may be pressing with a single finger or a plurality of fingers on the display 194, swiping with a single finger or a plurality of fingers (swiping toward or away from the display 194, or the like), a touch and hold operation, a large-area touch, or the like. In this case, after detecting the touch operation of the user, the electronic device 100 may obtain information such as the touch coordinates and the timestamp of the touch operation based on the touch sensor 180K, and determine, based on the information such as the touch coordinates and the timestamp, whether the touch operation is the predetermined gesture. If yes, the electronic device 100 enables the split screen function.

The button 190 includes a power button, a volume button, an input keyboard, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to produce an incoming call vibration prompt and a touch vibration feedback. For example, touch operations performed on different applications (for example, video playing and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to come into contact with and separate from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 is further compatible with different types of SIM cards. The SIM card interface 195 is further compatible with an external storage card. The electronic device 100 interacts with a network through the SIM card, to implement functions such as calling and data communication. In some examples, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, a cloud architecture, or the like. In this embodiment of this application, an Android system of a layered architecture is used as an example to illustrate a software structure of the electronic device 100.

Figure 3:
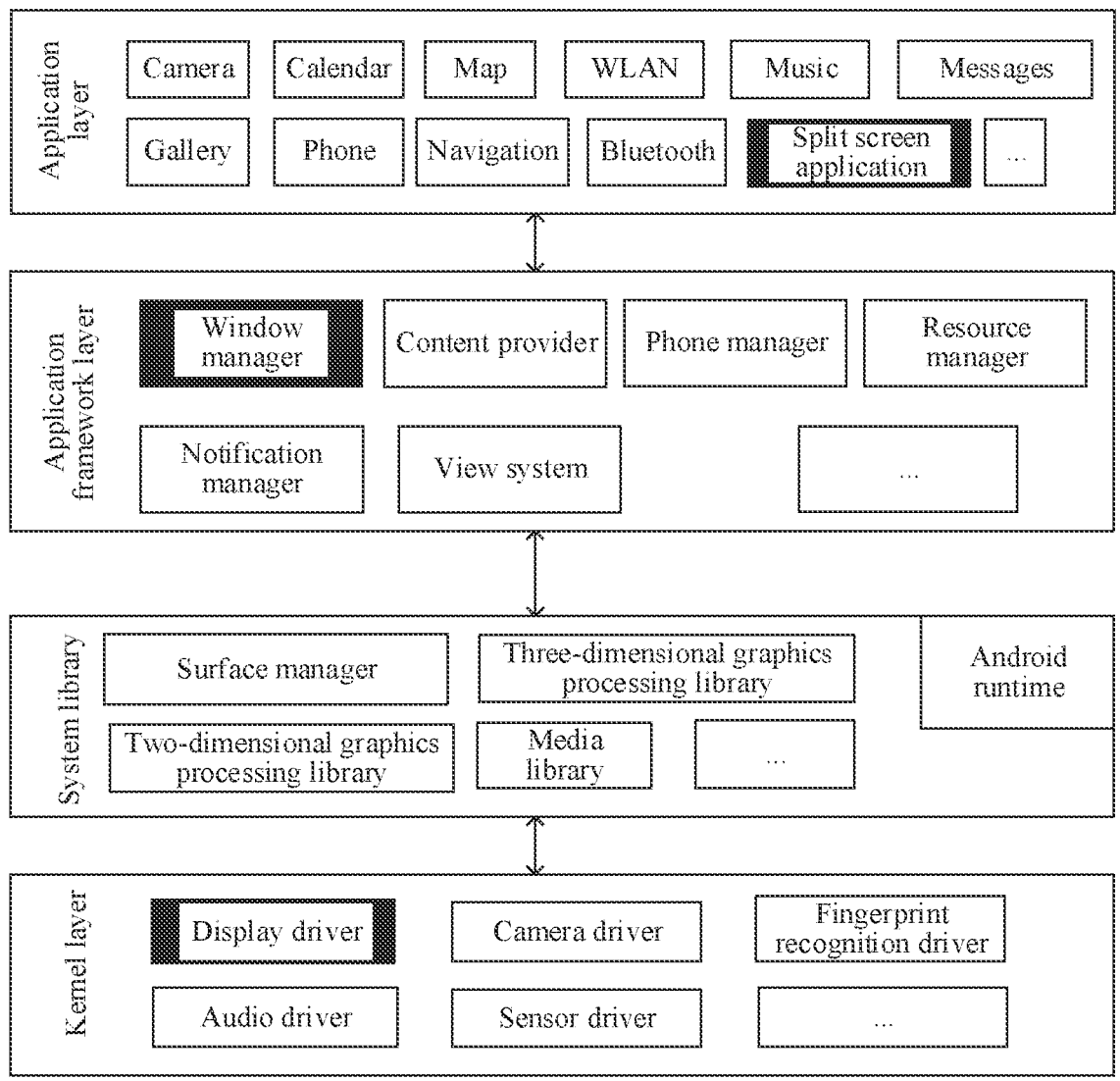
FIG. 3 is a schematic diagram of a software structure of an electronic device according to an embodiment of this application.

FIG. 3 is a schematic diagram of a software structure of an electronic device 100 according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and a system library, and a kernel layer from top to bottom.

The application layer may include a series of application packages.

As shown in FIG. 3, applications such as Camera. Gallery, Calendar, Phone, Map, Navigation, Bluetooth, Music, Video, and Messages may be installed at the application layer. In some embodiments of this application, the application further includes a split screen application. The split screen application may provide an interface for interaction between the electronic device 100 and a user. For example, the user sets a predefined gesture that triggers enabling of a split screen function, sets an application that supports the split screen function, and sets a size of each split screen window.

The application framework layer provides an application programming interface (application programming interface, API) and a programming framework for an application at the application layer. The application framework layer includes some predefined functions. As shown in FIG. 2, the application framework layer may further include a window manager, a content provider, a view system, a background service component, a phone manager, a resource manager, a notification manager, and the like. This is not limited in this embodiment of this application.

The window manager may be used to manage a window program. The window manager may obtain a size of a display, determine whether there is a status bar, lock a screen, capture a screen, and the like. In some embodiments of this application, the window manager may be specifically a window manager service (window manager service, WMS). The WMS stores information about each application window displayed on a current screen, for example, information such as a quantity of application windows displayed on the current screen. The split screen application may specifically determine a size and a location of each window based on the quantity of application windows displayed on the current screen.

The content provider is configured to store and obtain data, and allow the data to be accessed by an application. The data may include a video, an image, audio, calls that are made and answered, a browsing history and bookmarks, an address book, and the like.

The view system may include a visual control, for example, a control for displaying/inputting a text, a control for displaying a picture, or a control for displaying a video.

The view system may be used to construct an application. A display interface may include one or more views. For example, a display interface including an SMS message notification icon may include a text display view and a picture display view.

The background service component may be used to establish a mapping relationship between a desired control that is selected by the user for split screen and a split screen window, and synchronize data between the split screen control and the split screen window.

Specifically, after the user triggers the split screen function, the background service component is enabled. After the user selects the split screen control, the background service component may obtain related information of the control and perform registration. The related information of the control may include a communications address, an identity, and the like of the control. Then, after the split screen window is enabled, the background service component may obtain related information of the split screen window and perform registration. The related information of the split screen window may include a communications address, an identity, and the like of the split screen window. Then, the background service component can establish the mapping between the split screen control and the split screen window. In other words, the background service component may correspond a control and a split screen window in a one-to-one manner. After the background service component establishes the mapping relationship between the split screen control and the split screen window, and learns of a change in data in the control or the split screen window, the background service component may send changed data to a corresponding control or split screen window based on the mapping relationship between the control and the split screen window, to synchronize the data between the control and the split screen window.

In some embodiments, the background service component may continuously or periodically receive status information fed back by the split screen window. When the status information fed back by the split screen window shows that a split screen window is closed, the background service component may deregister registration information of the split screen window and deregister registration information of a control corresponding to the split screen window. When all registration information in the background service component is deregistered, the background service component exits a service.

The phone manager is used to provide a communications function of the electronic device 100, for example, management of a call status (including answering, declining, or the like).

The resource manager provides, to the application, various resources such as a localized character string, an icon, a picture, a layout file, and a video file.

The notification manager enables the application to display notification information in the status bar, and may be used to transmit a notification-type message. The displayed information may automatically disappear after a short pause without user interaction. For example, the notification manager is used to notify download completion, provide a message notification, and the like. The notification manager may alternatively be a notification that appears in a top status bar of the system in a form of a graph or a scroll bar text, for example, a notification of an application running in the background or a notification that appears on the screen in a form of a dialog window. For example, text information is displayed in the status bar, an announcement is given, the electronic device vibrates, or an indicator light blinks.

The Android runtime includes a kernel library and a virtual machine. The Android runtime is responsible for scheduling and managing an Android system.

The kernel library includes two parts: a function to be invoked by a java language, and a kernel library of Android.

The application layer and the application framework layer run on the virtual machine. The virtual machine executes Java files at the application layer and the application framework layer as binary files. The virtual machine is used to perform functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager may be used to manage a display subsystem and provide fusion of 2D and 3D layers for a plurality of applications.

The media library may support playback and recording in a plurality of commonly used audio and video formats, and static image files. The media library may support a plurality of audio and video encoding formats, for example, MPEG4, H264, MP3, AAC, AMR, JPG, and PNG.

The three-dimensional graphics processing library is used to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

All technical solutions in the following embodiments may be implemented in the electronic device 100 having the foregoing hardware architecture and software architecture.

In the split screen method provided in this embodiment of this application, the user may preset an enabling manner in which the electronic device performs a control split screen operation. The enabling manner may be set to voice enabling, touch enabling, or the like. Voice enabling may mean enabling the control split screen operation in a voice input manner. For example, the user may send a voice of "enabling control split screen", and after receiving the voice, the electronic device may perform the control split screen operation. Touch enabling may mean that enabling the control split screen operation through a tap operation, a multi-tap operation, a single-finger or multi-finger pressing operation, a single-finger or multi-finger swiping operation, touching a real or virtual button, or the like. For example, the user may touch and hold a display of the electronic device with three fingers, and after detecting the touch and hold operation with the three fingers, the electronic device may perform the control split screen operation.

The following describes in detail the technical solutions provided in this application with reference to the accompanying drawings by using an example in which the electronic device 100 is a mobile phone.

(1) Accessing a multi-window interface

Figure 4A:
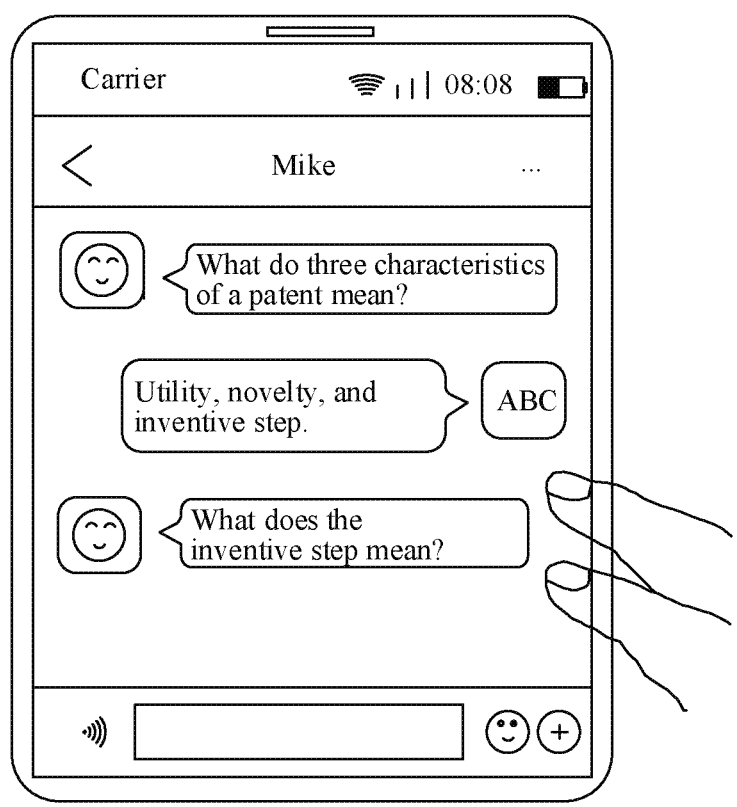
FIG. 4a is a schematic diagram of a display interface of an electronic device according to an embodiment of this application.

As shown in FIG. 4a, an application is started on a mobile phone, and an interface of the application is displayed. For example, when a user uses chat software such as WeChat® on the mobile phone, a chat interface of the chat software such as WeChat® may be displayed. The user inputs, on a screen of the mobile phone, a preset instruction for enabling a control split screen operation, for example, a touch and hold operation with two fingers. In this case, the mobile phone displays, in response to a detected instruction input by the user, an interface shown in FIG. 4b.

Figure 4B:
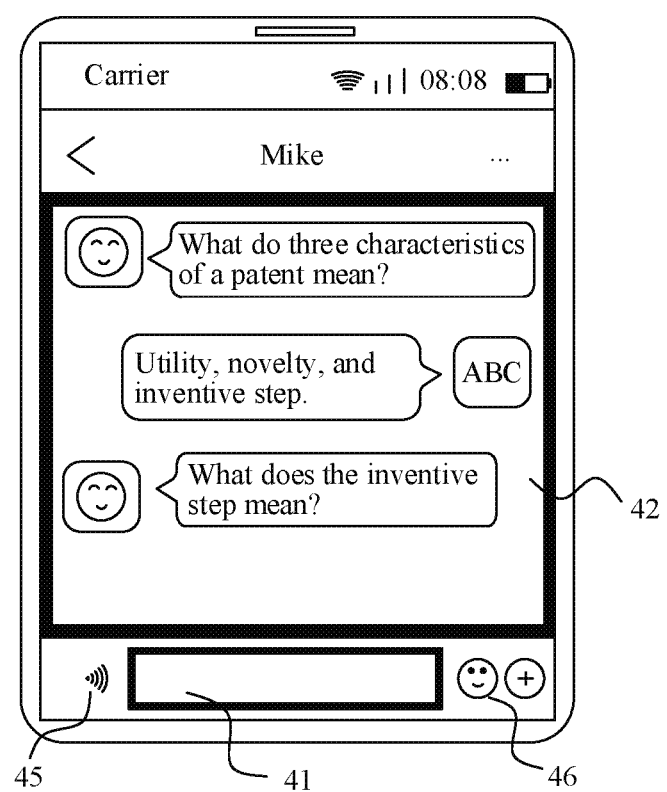
FIG. 4b is a schematic diagram of a display interface of an electronic device according to an embodiment of this application.

In the interface displayed on the mobile phone shown in FIG. 4b, a visual control that can support split screen in the application is presented in a target form for the user to select. The target form may be a border of a specific color (for example, red), or may be a continuous or intermittent jitter, or may be floating, or the like. For example, if the visual control that can support split screen in the chat software may include a text input control 41 and a text display control 42, the two controls may be presented in a red border manner.

Then, the user may input a control selection instruction in a voice manner, a touch manner, or the like, to select a desired control for split screen. For example, the user may tap and select the text input control 41 with a finger. If the user inputs the control selection instruction, the mobile phone displays, in response to the detected instruction input by the user, a multi-window interface shown in FIG. 4c. The multi-window interface may include an interface displayed in an original window 43 and an interface displayed in a split screen window 44. In addition, if the mobile phone does not detect, within preset duration (for example, 3s), the control selection instruction input by the user, the mobile phone may go to the interface before the control split screen operation. For example, after the mobile phone displays the interface in FIG. 4b, if the mobile phone does not detect the control selection instruction within the preset duration, the mobile phone goes to the interface displayed in FIG. 4a.

In this embodiment, a display area on a display of the mobile phone is divided into two windows: an upper window and a lower window. Sizes of the two windows may be the same or different.

The upper window may display the interface in the original window, namely, the chat interface of the application. In some examples, the mobile phone may rearrange the interface of the application in the upper window based on a size of a current window. For example, the mobile phone may retain an original text size, an original picture size, and the like in the interface of the application, and adjust displayed interface content of the application based on an actual size of a current upper window. Obviously, in this case, interface content of the application displayed in the upper window is less than interface content of the application displayed on the screen of the mobile phone before the split screen operation. For example, "What do three characteristics of a patent mean?" in content displayed in FIG. 4b is missing from content displayed in FIG. 4c. In addition, Mike's profile picture is also missing. For another example, the mobile phone reduces the original text size and the original picture size, and the like in the interface of the application, and then rearranges displayed interface content of the application based on an actual size of a current upper window. In this case, interface content of the application displayed in the upper window may be less than, the same as, or more than interface content of the application displayed on the screen of the mobile phone before the split screen operation. In an example, the mobile phone may alternatively zoom out an originally displayed interface based on a length and a width of the upper window. In this case, interface content of the application displayed in the upper window is the same as interface content of the application displayed on the screen of the mobile phone before the split screen operation.

Figure 4C:
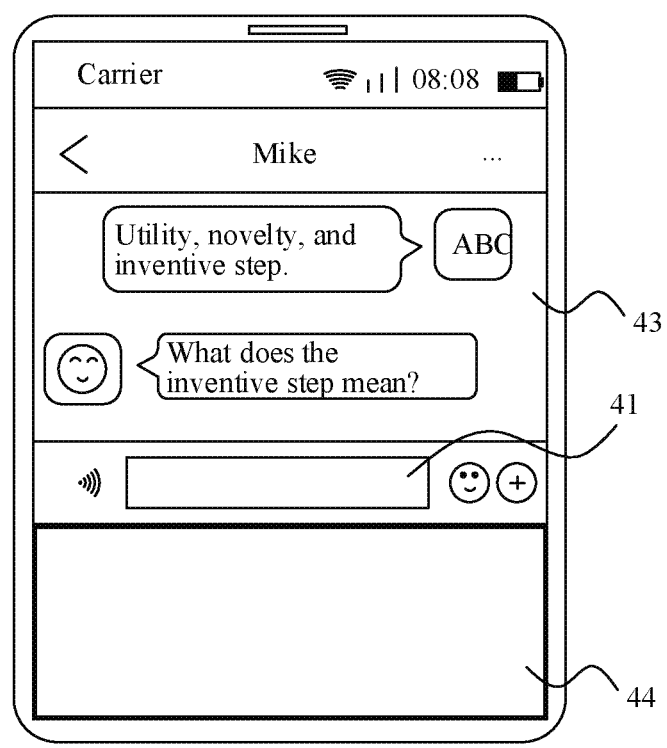
FIG. 4c is a schematic diagram of a display interface of an electronic device according to an embodiment of this application.
Figure 4D:
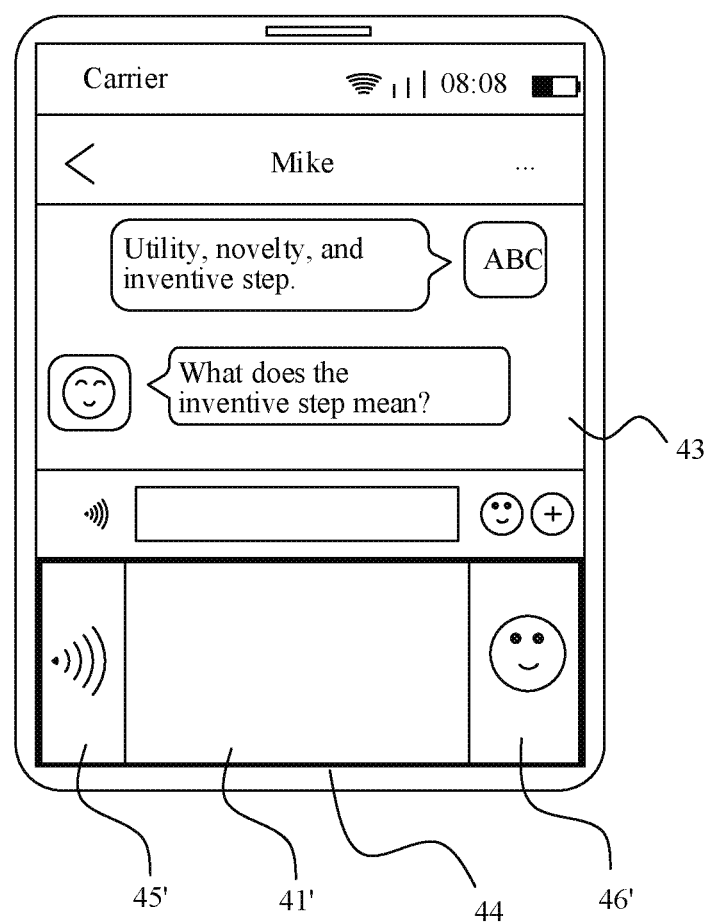
FIG. 4d is a schematic diagram of a display interface of an electronic device according to an embodiment of this application.

The lower window is a split screen window, and may display content on the control selected by the user. For example, when the control selected by the user for split screen is the text input control 41, content in the text input control 41 is displayed in the lower window. In addition, the user may input new content and the like in the split screen window. It may be understood that the split screen window may be equivalent to another presentation manner of the control selected by the user, for example, an enlarged version of the control selected by the user. In an example, in addition to selecting one visual control, the user may simultaneously select a plurality of visual controls, and then the plurality of visual controls selected by the user may be simultaneously displayed in the split screen window. For example, as shown in FIG. 4b, the user may simultaneously select the text input control 41, a voice input control 45, and an emoticon input control 46. In this case, as shown in FIG. 4d, the text input control 41', the voice input control 45', and the emoticon input control 46' are simultaneously displayed in the split screen window 44. It may be understood that the text input control 41, the voice input control 45, and the emoticon input control 46 may each correspond to one split screen window, and the three split screen windows are combined to form the split screen window 44. In addition, when selecting the plurality of visual controls, the user may simultaneously select the plurality of visual controls, or may select the plurality of visual controls at different time. For example, the user selects the plurality of visual controls within the preset duration (for example, 3s). This may be specifically determined based on an actual situation, and is not limited herein.

Figure 5A:
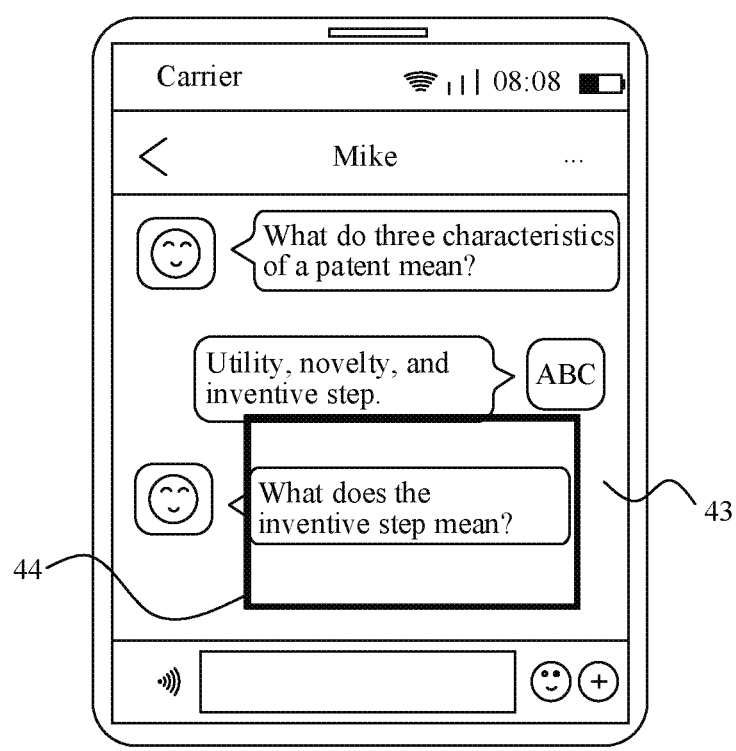
FIG. 5a is a schematic diagram of a display interface of an electronic device according to an embodiment of this application.

In some embodiments, the split screen window may float above the original window. In this case, a transparency of the split screen window may be higher than a preset transparency threshold, so that the user observes information displayed in the original window below the split screen window. For example, as shown in FIG. 5a, the split screen window 44 floats above the original window 43, and the split screen window 44 is transparent. Display information of "What does the inventive step mean?" is displayed above the original window 43. The split screen window 44 floating above the original window 43 may also be shown in FIG. 5b. The split screen window 44 floats above the original window 43. However, in this case, the split screen window 44 is not transparent, and display information on the original window 43 below the split screen window 44 cannot be seen.

Figure 6:
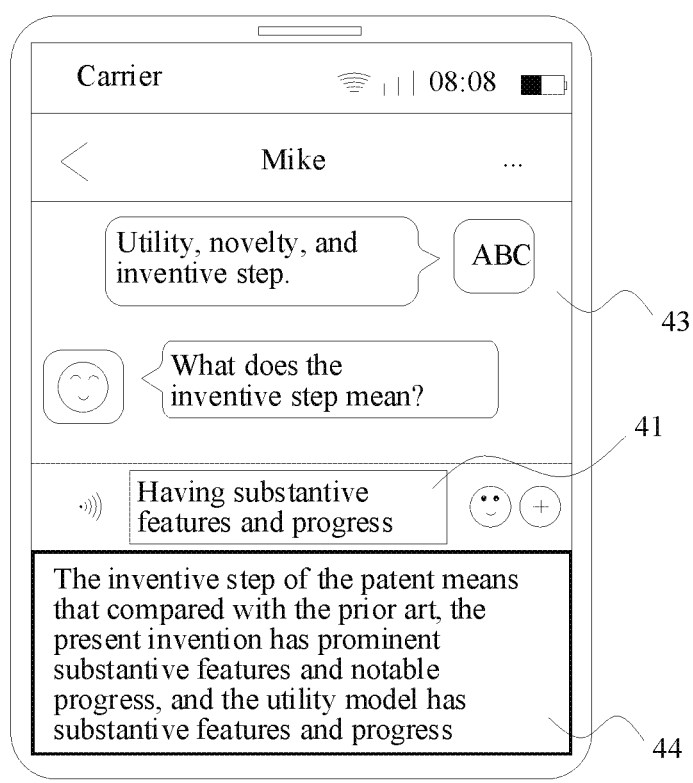
FIG. 6 is a schematic diagram of a display interface of an electronic device according to an embodiment of this application.

In some embodiments, a size of a display area of the split screen window may be larger than a size of an original display area of a control, to completely display data in the original control on the split screen window. This can improve user experience. The original control may be understood as a desired control that is selected by the user for split screen. For example, if the user inputs a plurality of lines of texts in the text input control, because a display area of the text input control is limited in size, only some texts can be displayed in the text input control. Therefore, in this case, when the control selected by the user for split screen is the text input control, the plurality of lines of text in the text input control may be displayed in the split screen window. For example, as shown in FIG. 6, a text input by the user in the text input control 41 is "The inventive step of the patent means that compared with the prior art, the present invention has prominent substantive features and notable progress, and the utility model has substantive features and progress". In this case, only the text "Having substantive features and progress" can be displayed in the text input control, and the text input by the user may be completely displayed in the split screen window 44.

Figure 7A:
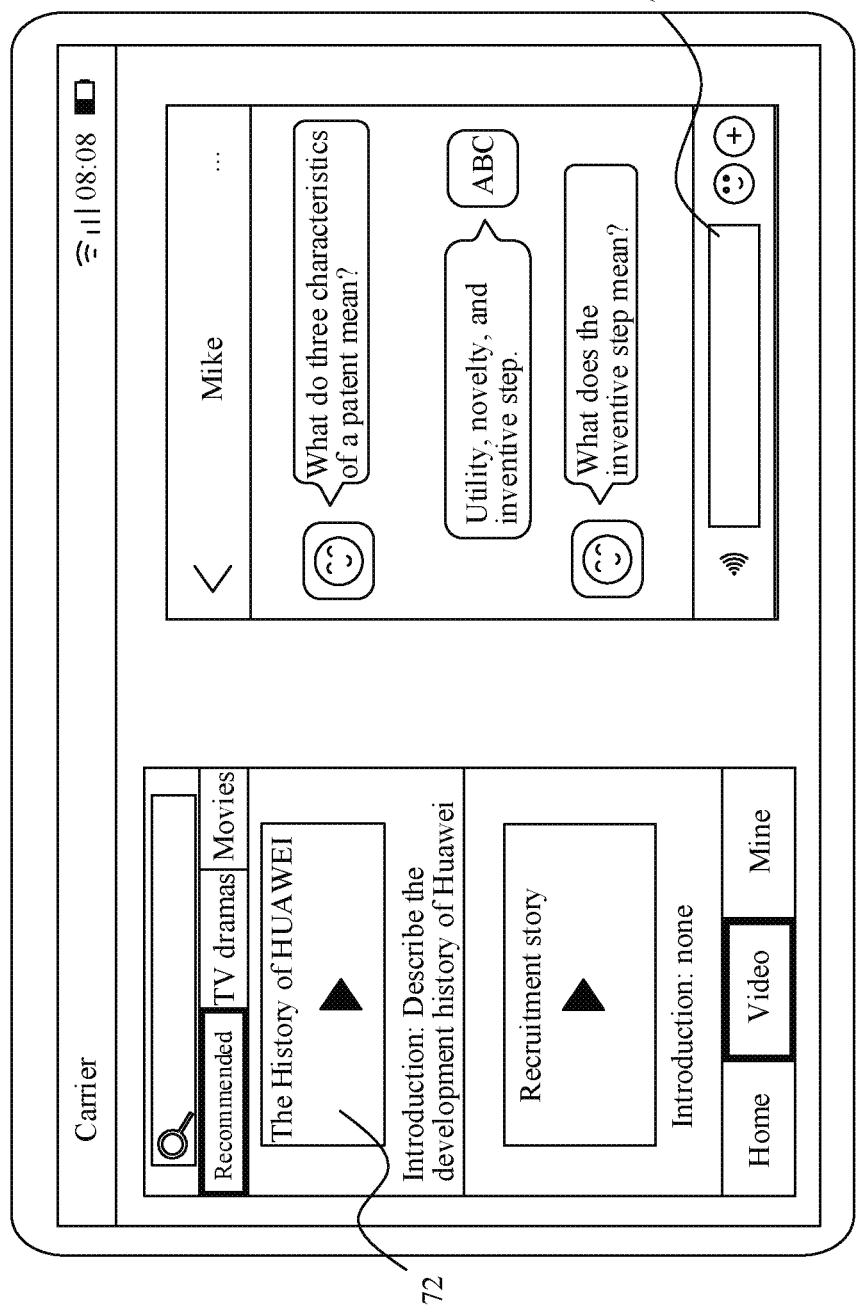
FIG. 7a is a schematic diagram of a display interface of an electronic device according to an embodiment of this application.

In some embodiments, there may be a plurality of split screen windows. For example, when the user selects a plurality of desired controls for split screen, one split screen window may be generated for each control. For example, the user simultaneously starts chat software and video software on one mobile phone in a multi-window mode. As shown in FIG. 7a, the user may simultaneously use the chat software to chat, and use the video software to watch/search for a video. Optionally, the chat software and the video software may also be separately displayed in two split screen windows.

Figure 7B:
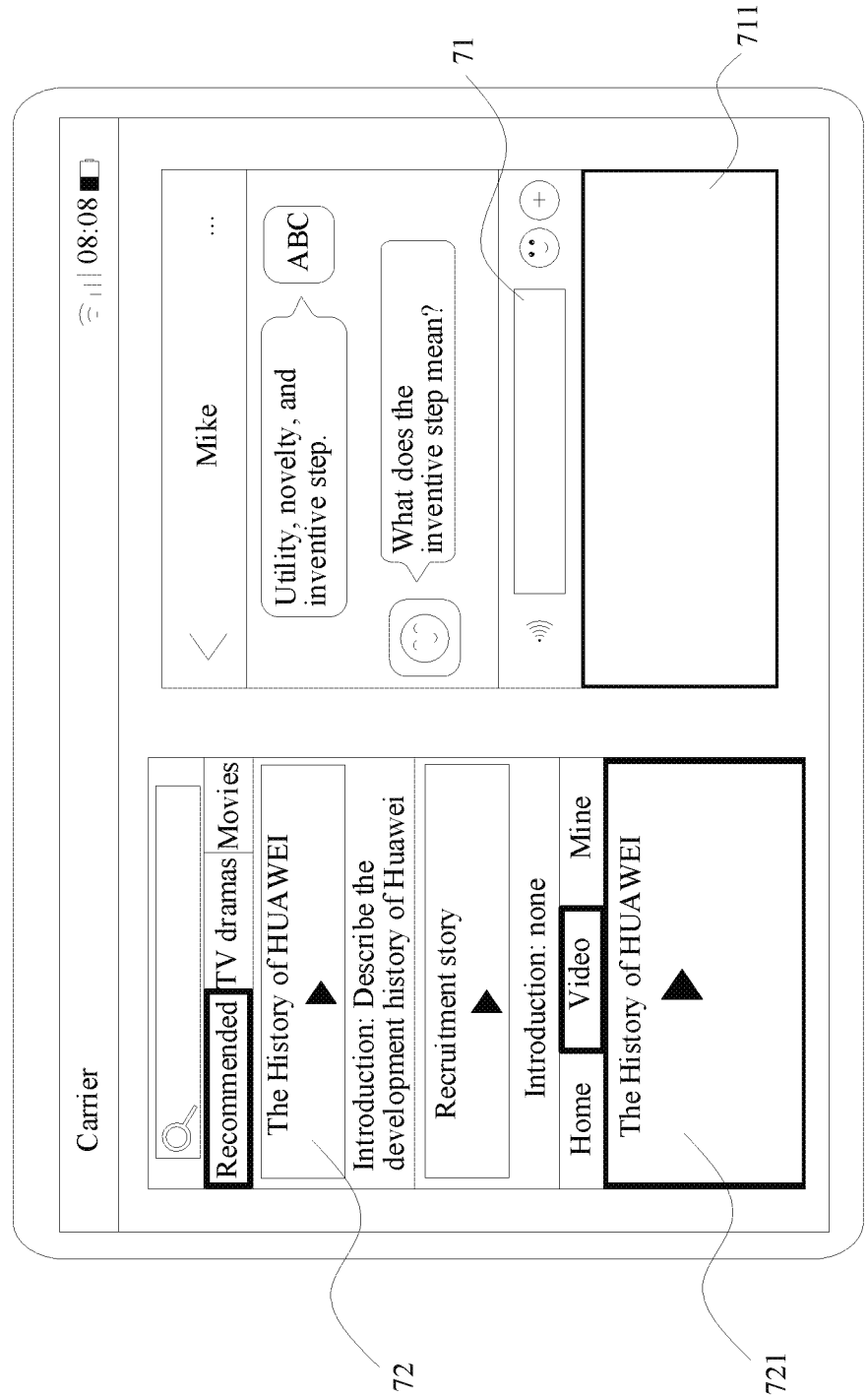
FIG. 7b is a schematic diagram of a display interface of an electronic device according to an embodiment of this application.

The user may first select a text input control in the chat software as a split screen control, and one split screen window is generated for the text input control on a screen of the mobile phone. Then, the user may select a video player control in the video software as a split screen control, and one split screen window is generated for the video player control on the screen of the mobile phone. In this case, at least two split screen windows exist on the screen of the mobile phone, and the two split screen windows respectively correspond to visual controls in different software. For example, as shown in FIG. 7a, the user is chatting with Mike, and is searching for a video by using the video software. The user may first select a text input control 71 in a chat window with Mike as a split screen control. In this case, as shown in FIG. 7b, the mobile phone may generate a split screen window 711 for the text input control 71. Then, the user selects a video player control 72 in the video software as a split screen control. In this case, as shown in FIG. 7b, the mobile phone may generate a split screen window 721 for the video player control 72. In this way, a plurality of split screen windows may be generated on the screen of the mobile phone.

Figure 7C:
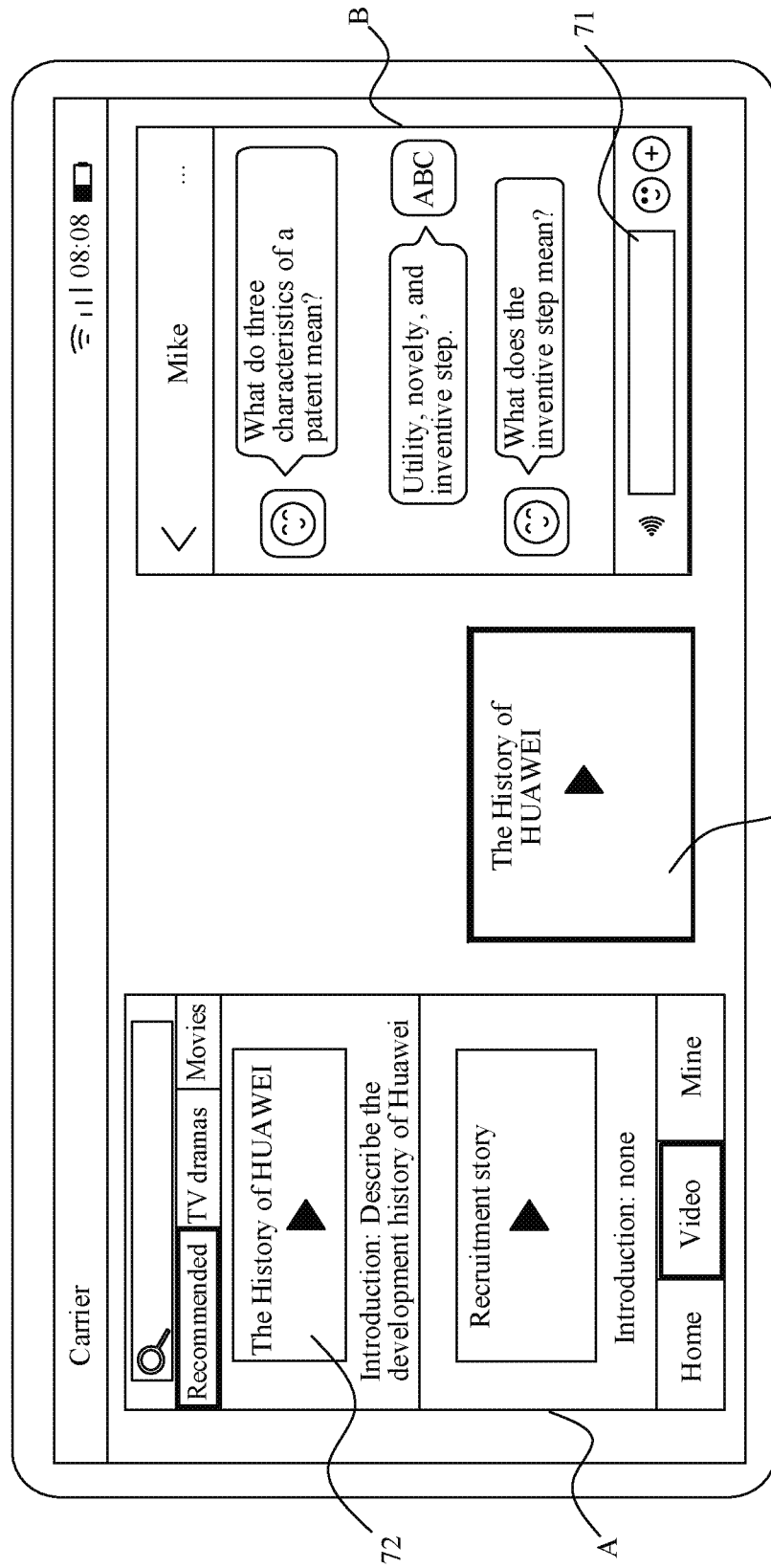
FIG. 7c is a schematic diagram of a display interface of an electronic device according to an embodiment of this application.
Figure 8A:
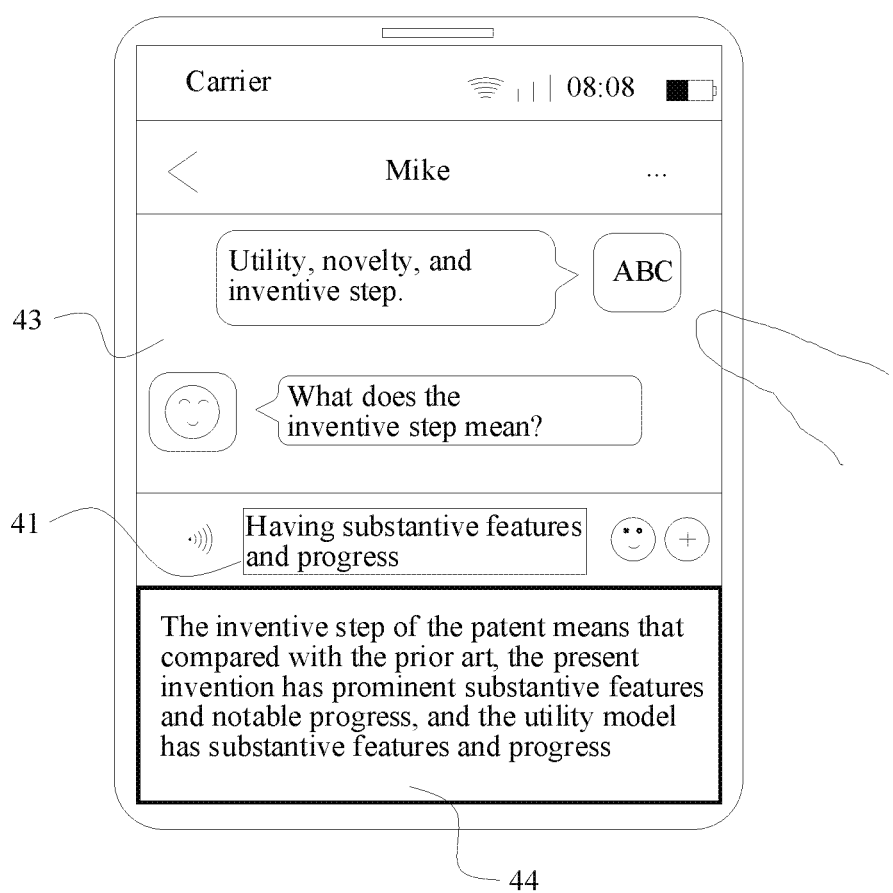
FIG. 8a is a schematic diagram of a display interface of an electronic device according to an embodiment of this application.
Figure 8B:
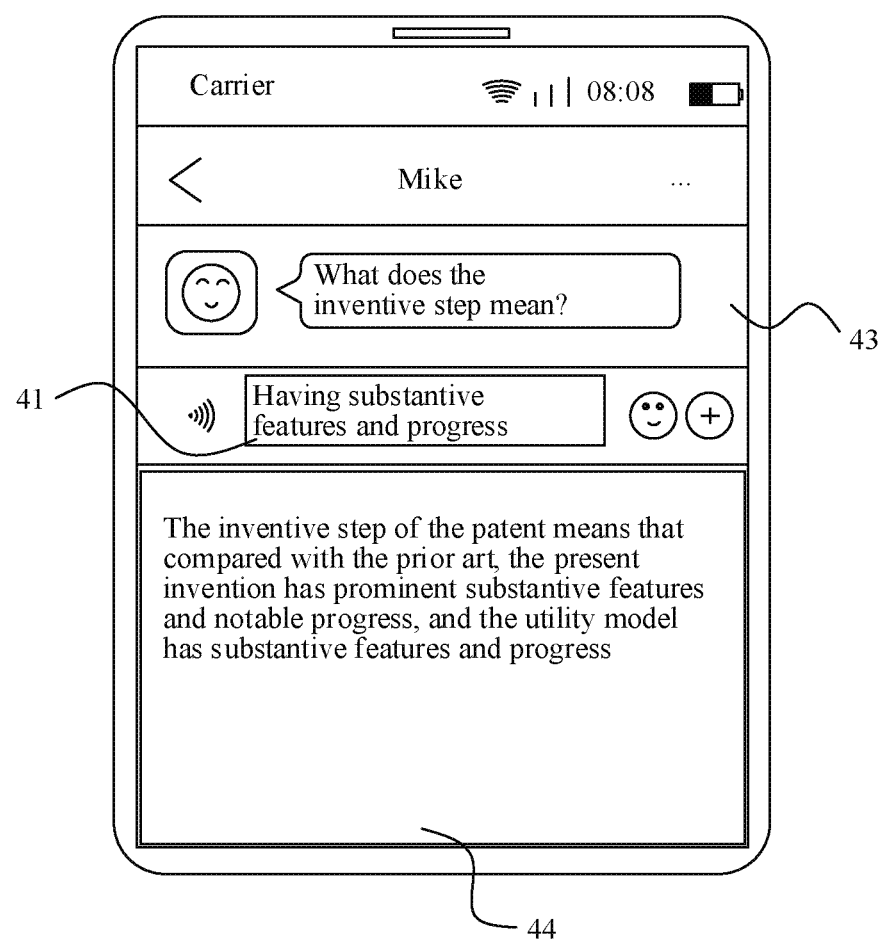
FIG. 8b is a schematic diagram of a display interface of an electronic device according to an embodiment of this application.

It may be understood that a location of the split screen window may be preset, or may be adjusted by the mobile phone based on a display status on the current screen. For example, as shown in FIG. 7c, the mobile phone places the split screen window 721 in the middle of the current screen based on the display status on the current screen. A location of the split screen window 721 in FIG. 7b may be understood as a location of the split screen window 721 in FIG. 7C before adjustment. In some embodiments, the user may adjust a size, a location, and the like of the split screen window through voice, touch, or the like. For example, as shown in FIG. 8a, if the user inputs, on the screen of a mobile phone, a preset instruction for enlarging a split screen window; for example, touching and holding with a single finger, the mobile phone displays, in response to the detected instruction input by the user, an interface shown in FIG. 8b, that is, enlarges an area occupied by the split screen window on the mobile phone.

(2) Operating on the Multi-Window Interface

Subsequently, the user may perform an operation in an upper window (namely, the original window) and a lower window (namely, the split screen window).

In the upper window, the user may browse historical interface content of the application, for example, scroll up. In addition, the user may further perform an operation on a visual control in the upper window; for example, input content in the text input control. For example, as shown in FIG. 4c, the user may input text content in the text input control 41 in the upper window (namely, the original window) 43. It may be understood that the upper window may be equivalent to the window of the mobile phone before the split screen operation. The operation in the upper window may be the same as an operation in the window of the mobile phone before the split screen operation.

In the lower window, the lower window corresponds to a control selected by the user. Therefore, the user may perform an operation in the lower window in the same way as operating a corresponding control on the original window. For example, when the lower window corresponds to the text input control, the user may input new content in the lower window. When the lower window corresponds to the video control, the user may watch content in the video control in the lower window.

It may be understood that the upper window and the lower window are equivalent to two separate window interfaces, and the user may perform different operations in the two windows. For example, when the display content of the application includes both text content and video content, the visual control in the application may include a text display control and a video display control, if the split screen control selected by the user is a video display control, the user may watch a video in the lower window (namely, the split screen window), and browse content in the text display control on the upper window (namely, the original window). In an example, the user may alternatively switch an application in the upper window (namely, the original window). For example, if a current application is a video application, the user may switch the current application to a chat application. It may be understood that the upper window may be equivalent to the window of the mobile phone before the split screen operation. The operation in the upper window may be the same as an operation in the window of the mobile phone before the split screen operation.

(3) Data Synchronization on the Multi-Window Interface

It should be understood that, when the mobile phone detects that the user inputs an instruction for enabling the control split screen operation, or detects that the user selects a desired control for split screen, the mobile phone may start a background service component of the mobile phone. After the user selects the split screen control, the mobile phone may register related information of the control with the service component, where the related information of the control may include a communications address, an identity, and the like of the control. After starting the split screen window, the mobile phone may also register related information of the split screen window with the service component, where the related information of the split screen window may include a communications address, an identity, and the like of the split screen window. Then, the mobile phone may establish a mapping relationship between the related information of the control and the related information of the split screen window. In other words, the mobile phone may correspond the control to the split screen window in a one-to-one manner.

Figure 9:
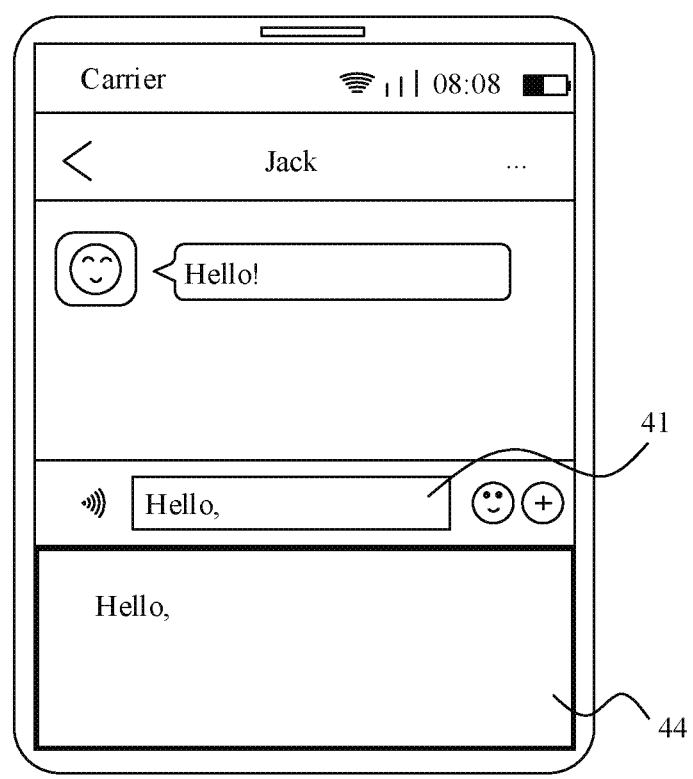
FIG. 9 is a schematic diagram of a display interface of an electronic device according to an embodiment of this application.

Then, when data in the control or the split screen window changes, the control or the split screen window may send notification information to the service component. The notification information may include changed data content, a communications address and an identity of a control or a split screen window to which the data content belongs, and the like. After receiving the notification information, the service component sends changed data to a corresponding control or split screen window based on the mapping relationship between the control and the split screen window, to synchronize data between the control and the split screen window in the original window. For example, as shown in FIG. 9, the user inputs "Hello," in the split screen window 44. After receiving the notification information of the split screen window 44, the service component sends data "Hello," to the text input control 41. Then, "Hello," may be displayed in the text input control 41. This implements data synchronization between the split screen window 44 and the text input control 41.

(4) Exiting the Multi-Window Interface

An exit button may be set in the split screen window or another window. When the exit button is tapped, the split screen window is closed, that is, a split screen mode is exited. In addition, the user may also quickly close the split screen window in another manner, for example, in a voice manner or a touch manner. For example, the mobile phone displays the interface shown in FIG. 4c. When the user selects to close the split screen window, the mobile phone goes to the interface shown in FIG. 4a. In some embodiments, after the user closes the split screen window, the background service component on the mobile phone may deregister registration information of the closed split screen window and deregister registration information of a control corresponding to the split screen window.

Figure 10:
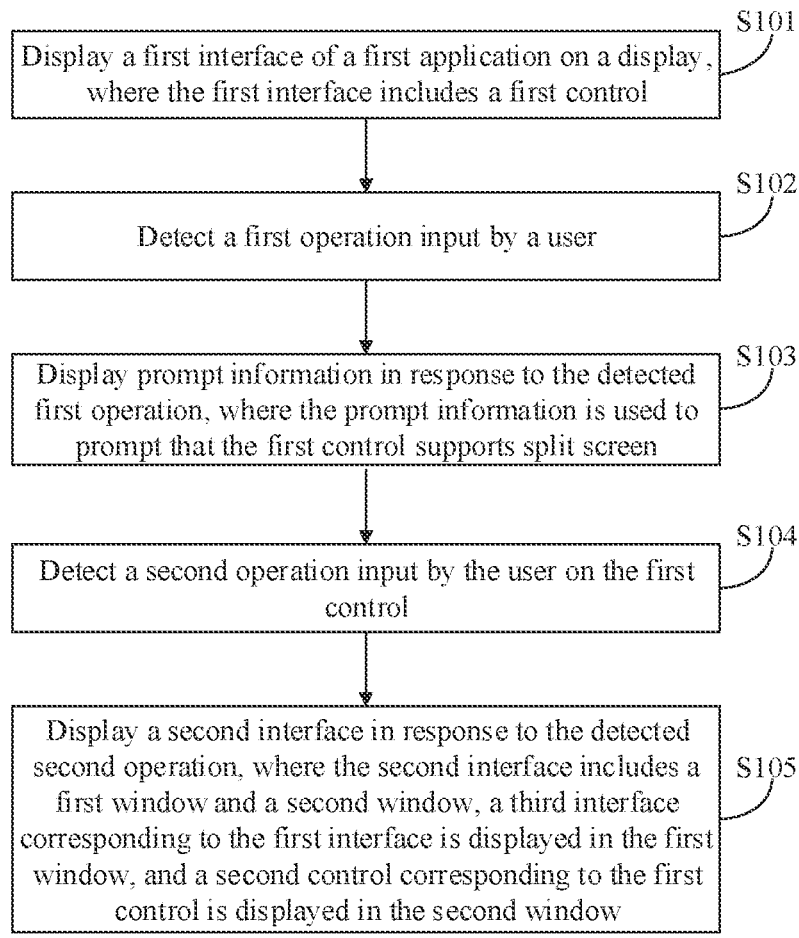
FIG. 10 is a schematic flowchart of a split screen method according to an embodiment of this application.

Next, refer to FIG. 10. FIG. 10 is a schematic flowchart of a split screen method according to an embodiment of this application. The split screen method may be applied to an electronic device having a display. As shown in FIG. 10, the method includes the following steps.

Step S101: Display a first interface of a first application on the display, where the first interface includes a first control.

In this solution, the application may also be referred to as an application program, software, or the like. Specifically, the first interface of the first application may be displayed on the display of the electronic device, where the first interface may include the first control. For example, when the first application is chat software, the interface shown in FIG. 1 may be displayed on the display. The interface includes a text input control 111.

Step S102: Detect a first operation input by a user.

Specifically, the electronic device may detect an input operation (namely, the first operation) of the user in real time or periodically. The input operation may be a voice input operation, or may be a touch operation. For example, the first operation may be a touch operation on the display of the electronic device in FIG. 4a, for example, touching and holding with two fingers. In this solution, the first operation may be understood as an operation that enables split screen of a control.

Step S103: Display prompt information in response to the detected first operation, where the prompt information is used to prompt that the first control supports split screen.

Specifically, after detecting the first operation input by the user, the electronic device displays prompt information in response to the detected first operation, to notify the user of a control that supports split screen. In this solution, the prompt information may be understood as information being used to prompt that the first control supports split screen. For example, the interface shown in FIG. 4b may be displayed, that is, the control that supports split screen is presented in a target form, for example, the text input control 41 and the text display control 42 presented in FIG. 4b.

Step S104: Detect a second operation input by the user on the first control.

Specifically, after displaying the prompt information, the electronic device may detect, in real time or periodically, the input operation (namely, the second operation) performed by the user on the first control. The input operation may be a voice input operation, or may be a touch operation. For a specific implementation, refer to the control selection instruction in the foregoing description. For example, the second operation may be a touch operation, for example, a tap operation on the text input control 41 in FIG. 4b. In this solution, the second operation may be understood as an operation of selecting a control.

Step S105: Display a second interface in response to the detected second operation. The second interface includes a first window and a second window A third interface corresponding to the first interface is displayed in the first window. A second control corresponding to the first control is displayed in the second window.

For example, for the first window, refer to the upper window shown in FIG. 4c, the original window 43 shown in FIG. 5a, and an area occupied by an interface other than the split screen windows 721 and 711 on the display shown in FIG. 7b, and an area occupied by an interface other than the split screen window 721 on the display shown in FIG. 7c. In addition, for the first window, refer to an area occupied by a video application A shown in FIG. 7c, or refer to an area jointly occupied by a video application A and a chat application B shown in FIG. 7c.

For the second window, refer to the lower window shown in FIG. 4c, the split screen window 44 in FIG. 5a, the split screen windows 711 and 721 shown in FIG. 7b, and the split screen window 721 shown in FIG. 7C.

Figure 4E:
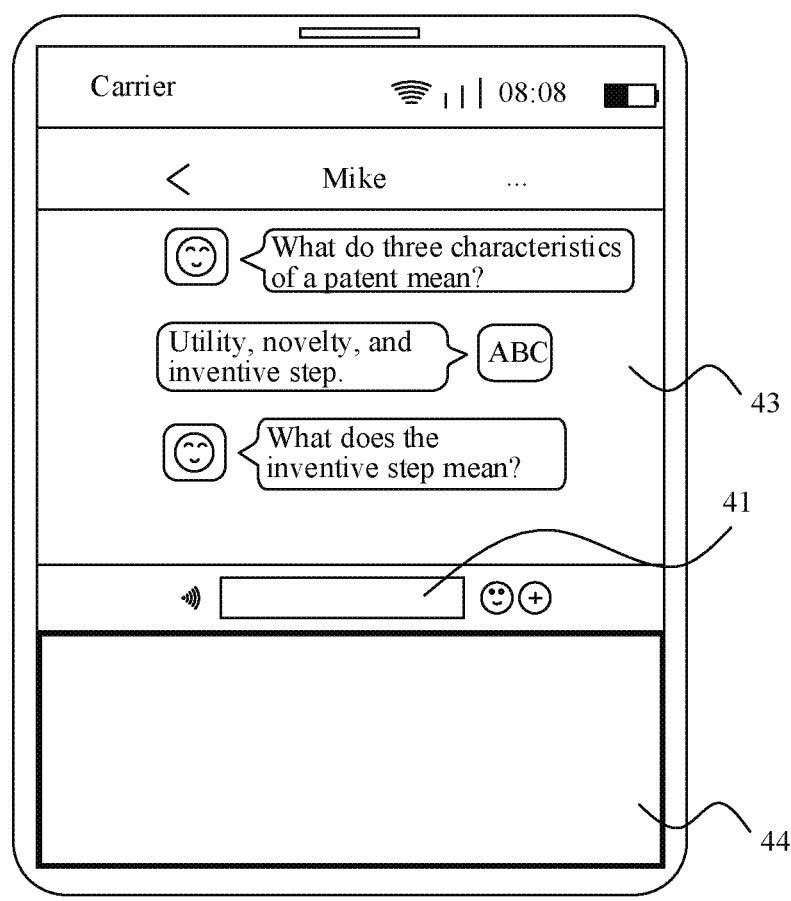
FIG. 4e is a schematic diagram of a display interface of an electronic device according to an embodiment of this application.

For the third interface, refer to an interface displayed in the original window 43 shown in FIG. 4c, an interface displayed in the original window 43 shown in FIG. 4e, an interface other than the split screen windows 721 and 711 on the display shown in FIG. 7b, and an interface other than the split screen window 721 on the display shown in FIG. 7c.

For the second control, refer to the text input control 41', the voice input control 45', and the emoticon input control 46' shown in FIG. 4d.

Specifically, after detecting the second operation input by the user, the electronic device displays, in response to the second operation, the second interface including the first window and the second window. The third interface corresponding to the first interface is displayed in the first window. The second control corresponding to the first control is displayed in the second window. In this manner, a split screen operation can be performed on the control on the application interface, so that the user can perform a corresponding operation on a split screen window; improving user experience. It may be understood that, in this solution, the third interface is an interface of the first application that is displayed after the control split screen operation, and the first interface is an interface of the first application that is displayed before the control split screen operation. The two interfaces are the interface of the first application in two presentation forms. For example, the third interface is a zoomed-out first interface, or the third interface is obtained after the first interface is tailored. In addition, in this solution, the second control may be understood as the first control in another presentation form, for example, an enlarged first control.

For example, after performing the second operation, the electronic device may display the interface shown in FIG. 4c. The interface displayed in the original window 43 in FIG. 4c corresponds to the interface displayed in FIG. 4a, and the interface displayed in the original window 43 also includes the text input control 41 in FIG. 4a. In addition, a control corresponding to the text input control 41 is displayed in the split screen window 44 in FIG. 4c. The user may perform a text input operation in the control displayed in the split screen window 44.

In an example, a size of a target area of the second control is larger than a size of a target area of the first control on the third interface. The target area includes at least one of an input area and a display area. For example, still refer to FIG. 4c. A size of an input area of the text input control 41 in the original window 43 is obviously smaller than a size of an input area of the second control on the split screen window 44.

In an example, the first control includes a text input control. Text information presented on the second control is more than text information presented on the first control on the third interface. Text information included in the second control is the same as text information included in the first control on the third interface. For example, refer to FIG. 6. Text information presented on the second control on the split screen window 44 is obviously more than text information presented on the text input control 41 in the original window 43. Text information included in the second control is the same as text information included in the text input control 41. In other words, not all the text information input by the user is displayed on the text input control 41 in the original window 43, but all the text information input by the user may be displayed on the second control on the split screen window 44.

Figure 5B:
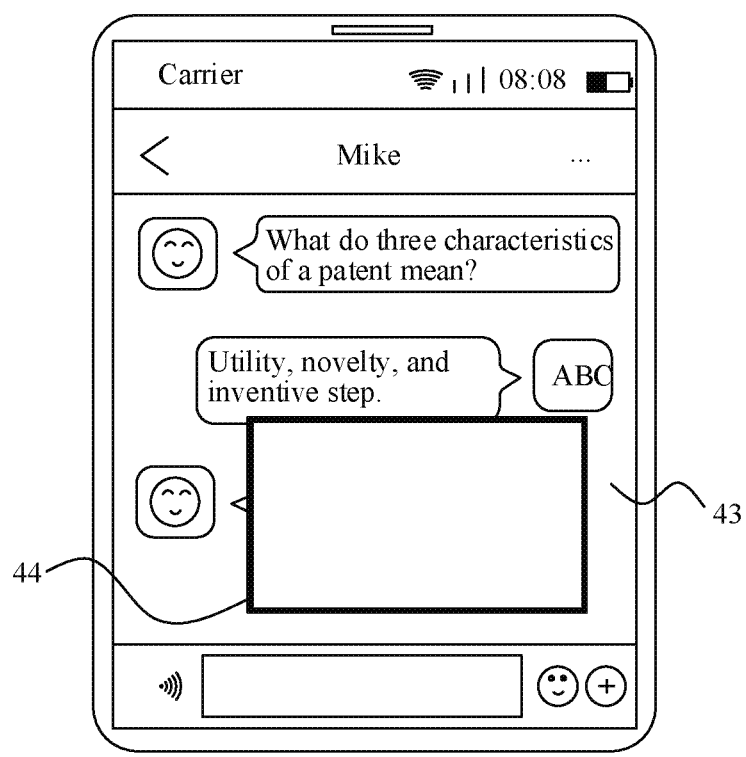
FIG. 5b is a schematic diagram of a display interface of an electronic device according to an embodiment of this application.

In an example, the second window floats above the first window. For example, as shown in FIG. 5a or FIG. 5b, the split screen window 44 floats above the original window 43.

Further, a transparency of the second window is higher than a preset transparency, so that the user views information in the first window. For example, as shown in FIG. 5a, the split screen window 44 is transparent, and the user may view the text information in the original window 43 through the split screen window 44, in other words, view "What does the inventive step mean?".

In an example, the second window is located on an upper side, a lower side, a left side, or a right side of the first window. There is no overlap between the second window and the first window.

In an example, a size of the first window is larger than or equal to a size of the second window. For example, still refer to FIG. 4c. A size of the original window 43 is larger than a size of the split screen window 44.

In an example, a display size of the third interface is smaller than or equal to a display size of the first interface. For example, as shown in FIG. 4a and FIG. 4c, a display size of an interface displayed in the original window 43 is smaller than a display size of an interface displayed in FIG. 4a.

In an example, a display size of the third interface is smaller than a display size of the first interface. First information displayed in the third interface is less than second information displayed in the first interface. Each of the first information and the second information includes at least one of text information and image information. The first information and the second information are of a same type. For example, as shown in FIG. 4a and FIG. 4c, a display size of an interface displayed in the original window 43 is smaller than a display size of an interface displayed in FIG. 4a. Compared with text information displayed in FIG. 4a, "What do three characteristics of a patent mean?" is missing from text information displayed in the original window 43.

In an example, a display size of the third interface is smaller than a display size of the first interface. Third information displayed in the third interface is the same as fourth information displayed in the first interface. A magnitude of the third information is less than a magnitude of the fourth information. Each of the third information and the fourth information includes at least one of text information and image information. The third information and the fourth information are of a same type. For example, as shown in FIG. 4a and FIG. 4e, the text information displayed in the original window 43 is the same as the text information displayed in FIG. 4*a*, but a magnitude of the text information displayed in the original window 43 is obviously less than a magnitude of the text information displayed in FIG. 4*a*.

In an example, the electronic device may synchronize data in the second control with data in the first control on the third interface. When determining that data in the second control has changed, the electronic device may synchronize changed data to the first control on the third interface. When determining that data in the first control on the third interface has changed, the electronic device may synchronize changed data to the second control. For example, as shown in FIG. 9, if the user inputs "Hello," in the control on the split screen window 44, the electronic device may send data of "Hello," to the text input control 41, and then "Hello," may be displayed in the text input control 41. In this way, the data of the controls in the two windows is synchronized.

Figure 11:
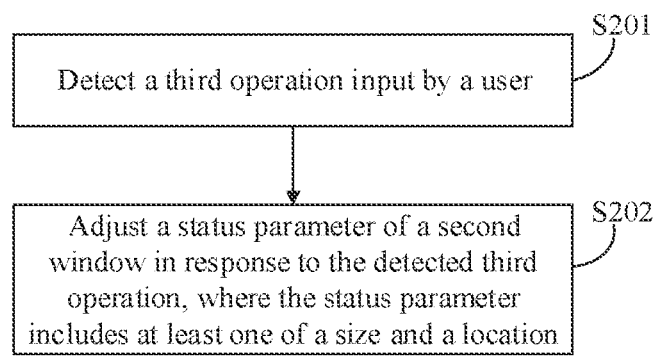
FIG. 11 is a schematic diagram of steps of adjusting a status parameter of a second window based on an input operation of a user according to an embodiment of this application.

In an example, an electronic device may adjust a status parameter of a second window based on an input operation of a user, to improve user experience. As shown in FIG. 11, there are the following steps.

Step S201: Detect a third operation input by the user.

Specifically, the electronic device may detect an input operation (namely, the third operation) of the user in real time or periodically. The input operation may be a voice input operation, or may be a touch operation. For example, the third operation may be a touch operation on the split screen window 44 in FIG. 4*c*, for example, touching, holding and swiping. In this solution, the third operation may be understood as adjusting the status parameter of the second window. The status parameter includes at least one of a size and a location. For example, the status parameter may be a size, or may be a location, or may be a size and a location.

Step S202: Adjust the status parameter of the second window in response to the detected third operation, where the status parameter includes at least one of the size and the location.

Specifically, after detecting the third operation input by the user, the electronic device adjusts the status parameter of the second window in response to the third operation, for example, adjusts the location of the second window. For example, as shown in FIG. 7*b* and FIG. 7*c*, the split screen window 721 may be adjusted from a location in FIG. 7*b* to a location in FIG. 7*c*.

Figure 12:
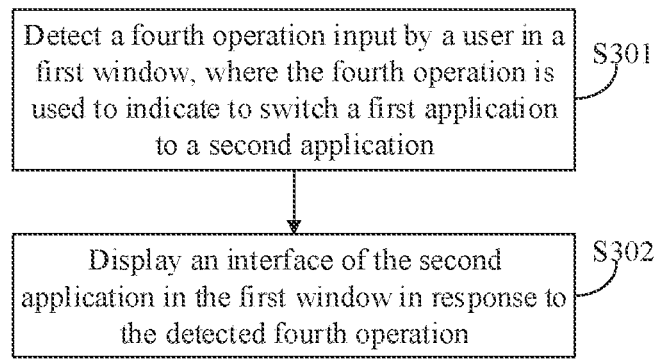
FIG. 12 is a schematic diagram of steps of switching an application in a first window based on an input operation of a user in the first window according to an embodiment of this application.

In an example, an electronic device may switch an application in a first window based on an input operation of a user in the first window. As shown in FIG. 12, there are the following steps.

Step S301: Detect a fourth operation input by the user in the first window where the fourth operation is used to indicate to switch a first application to a second application.

Specifically, the electronic device may detect an input operation (namely, the fourth operation) of the user in the first window in real time or periodically. The input operation may be a voice input operation, or may be a touch operation. For example, the fourth operation may be a touch operation on the application displayed in the original window 43 in FIG. 4*c*, for example, a multi-tap operation. In this solution, the fourth operation may be understood as switching the first application to the second application.

Step S302: Display an interface of the second application in the first window in response to the detected fourth operation.

Specifically, after detecting the fourth operation input by the user, the electronic device displays the interface of the second application in the first window in response to the fourth operation. For example, if a current application in the first window is a chat application, the user may switch the current application to a video application.

Figure 13:
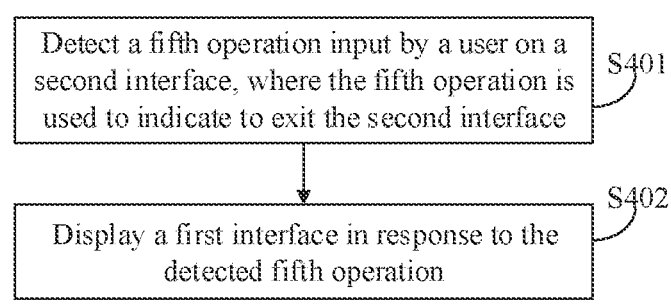
FIG. 13 is a schematic diagram of steps of closing a second interface and redisplaying a first interface based on an input operation of a user according to an embodiment of this application.

In an example, after displaying a second interface, an electronic device may further close the second interface and redisplay a first interface based on an input operation of a user. As shown in FIG. 13, there are the following steps.

Step S401: Detect a fifth operation input by the user on the second interface, where the fifth operation is used to indicate to exit the second interface.

Specifically, the electronic device may detect an input operation (namely, the fifth operation) of the user on the second interface in real time or periodically. The input operation may be a voice input operation, or may be a touch operation. For example, the fifth operation may be a touch operation on the interface displayed in FIG. 4*c*, for example, a tap operation. In this solution, the fifth operation may be understood as exiting the second interface.

Step S402: Display the first interface in response to the detected fifth operation.

Specifically, after detecting the fifth operation input by the user, the electronic device exits the second interface in response to the fifth operation, and displays the first interface. For example, as shown in FIG. 4*c*, if the user selects to exit an interface currently displayed by the electronic device, the electronic device may go to the interface displayed in FIG. 4*a*.

Figure 14:
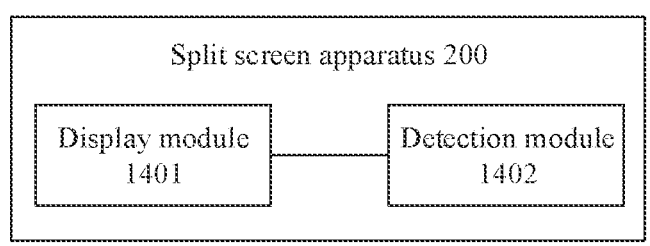
FIG. 14 is a schematic diagram of a structure of a split screen apparatus according to an embodiment of this application.

Based on the methods in the foregoing embodiments, an embodiment of this application further provides a split screen apparatus. The split screen apparatus is deployed on an electronic device having a display. FIG. 14 is a schematic diagram of a structure of a split screen apparatus according to an embodiment of this application. As shown in FIG. 14, the split screen apparatus 200 includes:

a display module 1401, configured to display a first interface of a first application on the display, where the first interface includes a first control; and a detection module 1402, configured to detect a first operation input by a user.

The display module 1401 is further configured to display prompt information in response to the first operation detected by the detection module 1402. The prompt information is used to prompt that the first control supports split screen.

The detection module 1402 is further configured to detect a second operation input by the user on the first control.

The display module 1401 is further configured to display a second interface in response to the second operation detected by the detection module 1402. The second interface includes a first window and a second window. A third interface corresponding to the first interface is displayed in the first window. A second control corresponding to the first control is displayed in the second window.

In an example, a size of a target area of the second control is larger than a size of a target area of the first control on the third interface. The target area includes at least one of an input area and a display area.

In an example, the first control includes a text input control. Text information presented on the second control is more than text information presented on the first control on the third interface. Text information included in the second control is the same as text information included in the first control on the third interface.

In an example, the second window floats above the first window.

In an example, a transparency of the second window is higher than a preset transparency.

In an example, the second window is located on an upper side, a lower side, a left side, or a right side of the first window. There is no overlap between the second window and the first window.

In an example, a size of the first window is larger than or equal to a size of the second window.

In an example, a display size of the third interface is smaller than or equal to a display size of the first interface.

In an example, a display size of the third interface is smaller than a display size of the first interface. First information displayed in the third interface is less than second information displayed in the first interface. Each of the first information and the second information includes at least one of text information and image information. The first information and the second information are of a same type.

In an example, a display size of the third interface is smaller than a display size of the first interface. Third information displayed in the third interface is the same as fourth information displayed in the first interface. A magnitude of the third information is less than a magnitude of the fourth information. Each of the third information and the fourth information includes at least one of text information and image information. The third information and the fourth information are of a same type.

In an example, the detection module 1402 is further configured to detect a third operation input by the user.

The apparatus 200 further includes an adjustment module (not shown in the figure), configured to adjust a status parameter of the second window in response to the third operation detected by the detection module 1402. The status parameter includes at least one of a size and a location.

In an example, the apparatus 200 further includes:

a data synchronization module (not shown in the figure), configured to determine that data in the second control has changed, and synchronize changed data to the first control on the third interface.

In an example, the detection module 1402 is further configured to detect a fourth operation input by the user in the first window. The fourth operation is used to indicate to switch the first application to a second application.

The display module 1401 is further configured to display an interface of the second application in the first window in response to the fourth operation detected by the detection module 1402.

In an example, the detection module 1402 is further configured to detect a fifth operation input by the user on the second interface. The fifth operation is used to indicate to exit the second interface.

The display module 1401 is further configured to display the first interface in response to the fifth operation detected by the detection module 1402.

It should be understood that the foregoing apparatus is configured to perform the methods in the foregoing embodiments, and an implementation principle and a technical effect of a corresponding program module in the apparatus are similar to those described in the foregoing methods. For a working process of the apparatus, refer to corresponding processes in the foregoing methods. Details are not described herein again.

Figure 15:
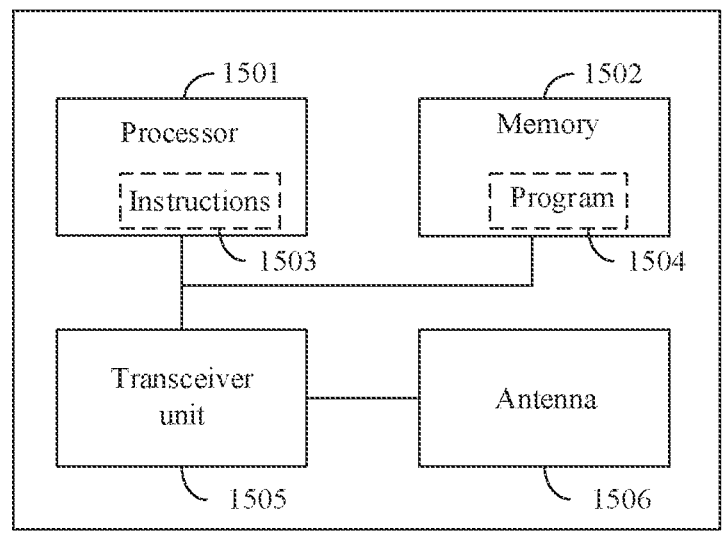
FIG. 15 is a schematic diagram of a structure of another split screen apparatus according to an embodiment of this application.

Based on the methods in the foregoing embodiment, an embodiment of this application further provides another split screen apparatus. FIG. 15 is a schematic diagram of a structure of another split screen apparatus according to an embodiment of this application. As shown in FIG. 15, in this embodiment of this application, the split screen apparatus may be configured to implement the methods described in the foregoing method embodiments.

The split screen apparatus includes at least one processor 1501. The at least one processor 1501 may support the split screen apparatus in performing the control methods provided in embodiments of this application.

The processor 1501 may be a general purpose processor or a dedicated processor. For example, the processor 1501 may include a central processing unit (central processing unit, CPU) and/or a baseband processor. The baseband processor may be configured to process communications data (for example, determine a target screen terminal). The CPU may be configured to implement corresponding control and processing functions, execute a software program, and process data of the software program.

Further, the split screen apparatus may further include a transceiver unit 1505, configured to implement signal input (receiving) and signal output (sending). For example, the transceiver unit 1505 may include a transceiver or a radio frequency chip. The transceiver unit 1505 may further include a communications interface.

Optionally, the split screen apparatus may further include an antenna 1506, which may be configured to support the transceiver unit 1505 in implementing receiving and sending functions of the split screen apparatus.

Optionally, the split screen apparatus may include one or more memories 1502, where the memory 1502 stores a program (which may also be instructions or code) 1504. The program 1504 may be run by a processor 1501, so that the processor 1501 performs the methods described in the foregoing method embodiments. Optionally, the memory 1502 may further store data. Optionally, the processor 1501 may further read data (for example, prestored first characteristic information) stored in the memory 1502. The data and the program 1504 may be stored at a same memory address, or may be stored at different memory addresses.

The processor 1501 and the memory 1502 may be separately disposed, or may be integrated together, for example, integrated on a board or a system on chip (system on chip, SOC).

For detailed descriptions of operations performed by the split screen apparatus in the foregoing possible designs, refer to the descriptions in the split screen method embodiments provided in embodiments of this application. Details are not described herein again.

Based on the apparatus in the foregoing embodiments, an embodiment of this application further provides an electronic device. The electronic device includes any split screen apparatus provided in the foregoing embodiments.

Figure 16:
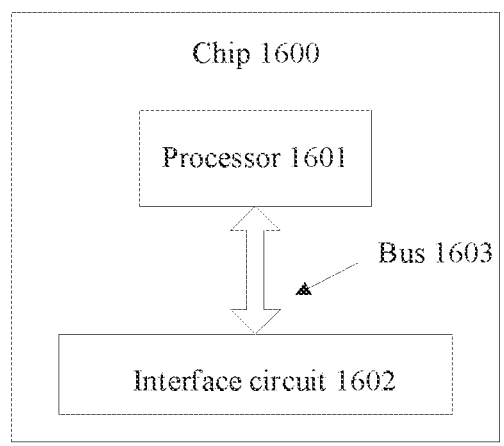
FIG. 16 is a schematic diagram of a structure of a chip according to an embodiment of this application.

Based on the methods in the foregoing embodiments, an embodiment of this application further provides a chip. FIG. 16 is a schematic diagram of a structure of a chip according to an embodiment of this application. As shown in FIG. 16, the chip 1600 includes one or more processors 1601 and an interface circuit 1602. Optionally, the chip 1600 may further include a bus 1603.

The processor 1601 may be an integrated circuit chip, having a signal processing capability. In an implementation process, the steps in the foregoing methods may be implemented by using a hardware integrated logical circuit in the processor 1601, or by using instructions in a form of software. The processor 1601 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 1601 may implement or perform the methods and the steps that are disclosed in embodiments of this application. The general purpose processor may be a microprocessor, or any conventional processor.

The interface circuit 1602 may be configured to send or receive data, instructions, or information. The processor 1601 may perform processing based on the data, the instructions, or other information received by the interface circuit 1602, and send processed information through the interface circuit 1602.

Optionally, the chip further includes a memory. The memory may include a read-only memory and a random access memory, and provide an operation instruction and data to the processor. A part of the memory may further include a non-volatile random access memory (NVRAM).

Optionally, the memory stores an executable software module or a data structure. The processor may perform a corresponding operation by invoking an operation instruction (the operation instruction may be stored in an operating system) stored in the memory.

Optionally, the interface circuit 1602 may be configured to output an execution result of the processor 1601.

It should be noted that functions corresponding to the processor 1601 and the interface circuit 1602 may be implemented by using a hardware design, or may be implemented by using a software design, or may be implemented by a combination of hardware and software. This is not limited herein.

It should be understood that steps in the foregoing method embodiments can be implemented by using a hardware integrated logical circuit in the processor, or by using instructions in a form of software.

It should be understood that the processor in embodiments of this application may be a central processing unit (central processing unit, CPU), a general purpose processor, a digital signal processor (digital signal processing, DSP), an application-specific integrated circuit (application-specific integrated circuit, ASIC), a field programmable gate array (field programmable gate array, FPGA), or another programmable logic device, a transistor logic device, a hardware component, or any combination thereof. The general purpose processor may be a microprocessor, or any conventional processor.

The method steps in embodiments of this application may be implemented in a hardware manner, or may be implemented in a manner of executing software instructions by the processor. The software instruction may include a corresponding software module. The software module may be stored in a random access memory (random access memory, RAM), a flash memory, a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a mobile hard disk, a CD-ROM, or any other form of storage medium well known in the art. For example, a storage medium is coupled to a processor, so that the processor can read information from the storage medium and write information into the storage medium. Certainly, the storage medium may alternatively be a component of the processor. The processor and the storage medium may be disposed in an ASIC.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general purpose computer, a dedicated computer, a computer network, or another programmable apparatus. The computer instructions may be stored in a computer-readable storage medium or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

It may be understood that various numbers in embodiments of this application are only used for differentiation for ease of description, and are not used to limit the scope of embodiments of this application.

What is claimed is:

1. A method, applied to an electronic device having a display, wherein the method comprises:
   displaying a first interface of a first application on the display, wherein the first interface comprises a first control;
   detecting a first operation input by a user;
   displaying prompt information in response to the detected first operation, wherein the prompt information is used to prompt that the first control supports split screen;
   detecting a second operation input by the user on the first control; and
   displaying a second interface in response to the detected second operation, wherein the second interface comprises a first window and a second window, a third interface corresponding to the first interface is displayed in the first window, and a second control corresponding to the first control is displayed in the second window.

2. The method according to claim 1, wherein a size of a target area of the second control is larger than a size of a target area of the first control on the third interface, and each target area comprises at least one of an input area and a display area.

3. The method according to claim 2, wherein the first control comprises a text input control, text information presented on the second control is more than text information presented on the first control on the third interface, and text information comprised in the second control is the same as text information comprised in the first control on the third interface.

4. The method according to claim 1, wherein a display size of the third interface is smaller than a display size of the first interface, first information displayed in the third interface is less than second information displayed in the first interface, each of the first information and the second information comprises at least one of text information and image information, and the first information and the second information are of a same type.

5. The method according to claim 1, wherein a display size of the third interface is smaller than a display size of the first interface, third information displayed in the third interface is the same as fourth information displayed in the first interface, a magnitude of the third information is less than a magnitude of the fourth information, each of the third information and the fourth information comprises at least one of text information and image information, and the third information and the fourth information are of a same type.

6. The method according to claim 1, wherein the method further comprises:
 detecting a third operation input by the user; and
 adjusting a status parameter of the second window in response to the detected third operation, wherein the status parameter comprises at least one of a size and a location.

7. The method according to claim 1, wherein the method further comprises:
 determining that data in the second control has change; and
 synchronizing changed data to the first control on the third interface.

8. The method according to claim 1, wherein the method further comprises:
 detecting a fourth operation input by the user in the first window, wherein the fourth operation is used to indicate to switch the first application to a second application; and
 displaying an interface of the second application in the first window in response to the detected fourth operation.

9. The method according to claim 1, wherein after the displaying a second interface, the method further comprises:
 detecting a fifth operation input by the user on the second interface, wherein the fifth operation is used to indicate to exit the second interface; and
 displaying the first interface in response to the detected fifth operation.

10. An apparatus, deployed on an electronic device having a display, wherein the apparatus comprises:
 at least one Processor; and
 one or more memories coupled to the at least one processor and storing programming instructions for execution by the at least one processor to:
  display a first interface of a first application on the display, wherein the first interface comprises a first control;
  detect a first operation input by a user;
  display prompt information in response to the detected first operation, wherein the prompt information is used to prompt that the first control supports split screen;
  detect a second operation input by the user on the first control; and
  display a second interface in response to the detected second operation, wherein the second interface comprises a first window and a second window, a third interface corresponding to the first interface is displayed in the first window; and a second control corresponding to the first control is displayed in the second window.

11. The apparatus according to claim 10, wherein a size of a target area of the second control is larger than a size of a target area of the first control on the third interface, and each target area comprises at least one of an input area and a display area.

12. The apparatus according to claim 11, wherein the first control comprises a text input control, text information presented on the second control is more than text information presented on the first control on the third interface, and text information comprised in the second control is the same as text information comprised in the first control on the third interface.

13. The apparatus according to claim 10, wherein a display size of the third interface is smaller than a display size of the first interface, first information displayed in the third interface is less than second information displayed in the first interface, each of the first information and the second information comprises at least one of text information and image information, and the first information and the second information are of a same type.

14. The apparatus according to claim 10, wherein a display size of the third interface is smaller than a display size of the first interface, third information displayed in the third interface is the same as fourth information displayed in the first interface, a magnitude of the third information is less than a magnitude of the fourth information, each of the third information and the fourth information comprises at least one of text information and image information, and the third information and the fourth information are of a same type.

15. The apparatus according to claim 10, wherein the programming instructions are for execution by the at least one processor to:
 detect a third operation input by the user; and
 adjust a status parameter of the second window in response to the detected third operation, wherein the status parameter comprises at least one of a size and a location.

16. The apparatus according to claim 10, wherein the programming instructions are for execution by the at least one processor to:
 determine that data in the second control has changed, and synchronize changed data to the first control on the third interface.

17. The apparatus according to claim 10, wherein the programming instructions are for execution by the at least one processor to:
 detect a fourth operation input by the user in the first window, wherein the fourth operation is used to indicate to switch the first application to a second application; and
 display an interface of the second application in the first window in response to the detected fourth operation.

18. The apparatus according to claim 10, wherein the programming instructions are for execution by the at least one processor to:
 detect a fifth operation input by the user on the second interface, wherein the fifth operation is used to indicate to exit the second interface; and
 display the first interface in response to the detected fifth operation.

19. A non-transitory computer-readable, storage medium, wherein the computer-readable, storage medium stores instructions which, when executed by a computer, cause the computer to perform operations comprising:
 displaying a first interface of a first application on the display, wherein the first interface comprises a first control;
 detecting a first operation input by a user;
 displaying prompt information in response to the detected first operation, wherein the prompt information is used to prompt that the first control supports split screen;

detecting a second operation input by the user on the first control; and displaying a second interface in response to the detected second operation, wherein the second interface comprises a first window and a second window, a third interface corresponding to the first interface is displayed in the first window, and a second control corresponding to the first control is displayed in the second window.

20. The non-transitory computer-readable storage medium according to claim 19, wherein a size of a target area of the second control is larger than a size of a target area of the first control on the third interface, and each target area comprises at least one of an input area and a display area.

* * * * *

UNITED STATES PATENT AND TRADEMARK OFFICE
CERTIFICATE OF CORRECTION

PATENT NO. : 11,972,106 B2
APPLICATION NO. : 18/245688
DATED : April 30, 2024
INVENTOR(S) : Meng Deng et al.

Page 1 of 1

It is certified that error appears in the above-identified patent and that said Letters Patent is hereby corrected as shown below:

In the Claims

Column 31, Line 20, Claim 7, please delete "change;" and insert therefore -- changed; --;

Column 31, Line 42, Claim 10, please delete "Processor;" and insert therefore -- processor; --;

Column 32, Line 57, Claim 19, please delete "computer-readable," and insert therefore -- computer-readable --;

Column 32, Line 58, Claim 19, please delete "computer-readable," and insert therefore -- computer-readable --.

Signed and Sealed this
Twenty-seventh Day of August, 2024

Katherine Kelly Vidal
*Director of the United States Patent and Trademark Office*